(12) United States Patent (10) Patent No.: US 7,838,143 B2
Onnerud et al. (45) Date of Patent: Nov. 23, 2010

(54) CID RETENTION DEVICE FOR LI-ION CELL

(75) Inventors: Per Onnerud, Framingham, MA (US); Phillip E. Partin, Grafton, MA (US); Richard V. Chamberlain, II, Fairfax Station, VA (US); Jan-Roger B. Linna, Boston, MA (US); Mimmo Elia, Belmont, MA (US)

(73) Assignee: Boston-Power, Inc., Westborough, MA (US)

( * ) Notice: Subject to any disclaimer, the term of this patent is extended or adjusted under 35 U.S.C. 154(b) by 0 days.

(21) Appl. No.: 12/214,535

(22) Filed: Jun. 19, 2008

(65) Prior Publication Data

US 2009/0029193 A1 Jan. 29, 2009

Related U.S. Application Data

(60) Provisional application No. 60/936,825, filed on Jun. 22, 2007.

(51) Int. Cl.
*H01M 14/00* (2006.01)
*H01M 2/26* (2006.01)
*H01M 2/28* (2006.01)

(52) U.S. Cl. .................................. 429/122; 429/163

(58) Field of Classification Search ............... 429/7, 429/53, 54, 56, 57, 59, 61, 62, 86, 94, 170, 429/174, 161

See application file for complete search history.

(56) References Cited

U.S. PATENT DOCUMENTS 4,028,478 A * 6/1977 Tucholski .................... 429/61

(Continued)

FOREIGN PATENT DOCUMENTS

CN 101479865 A 4/2009

(Continued)

OTHER PUBLICATIONS

International Search Report, PCT/US2007/014592, 3 pp., Date of Mailing Mar. 20, 2008.

(Continued)

*Primary Examiner*—Jennifer K Michener
*Assistant Examiner*—Eli S Mekhlin
(74) *Attorney, Agent, or Firm*—Hamilton, Brook, Smith & Reynolds, P.C.

(57) ABSTRACT

A low pressure current interrupt device (CID) activates at a minimal threshold internal gauge pressure in a range of, for example, between about 4 kg/cm$^2$ and about 9 kg/cm$^2$. Preferably, the CID includes a first conductive plate and a second conductive plate in electrical communication with the first conductive plate, the electrical communication between the first and the second conductive plates being interrupted at the minimal threshold internal gauge pressure. More preferably, the first conductive plate includes a frustum having a first end and a second end, a base extending radially from a perimeter of the first end of the frustum, and an essentially planar cap sealing the second end of the frustum. The first end has a broader diameter than the second end. More preferably, the second conductive plate is in electrical contact with the essentially planar cap through a weld. A battery, preferably a lithium-ion battery, comprises a CID as described above. A method of manufacturing such a CID comprises forming first and second conductive plates as described above, and welding the second conductive plate onto the first conductive plate while a temperature of the first conductive plate is controlled so as not to exceed the melting point of a surface of the first conductive plate opposite the weld.

58 Claims, 18 Drawing Sheets

U.S. PATENT DOCUMENTS

| | | | |
|---|---|---|---|
| 4,576,303 | A | 3/1986 | Mundt et al. |
| 4,787,180 | A | 11/1988 | Robinson et al. |
| 4,788,112 | A | 11/1988 | Kung |
| 4,838,447 | A | 6/1989 | Albracht et al. |
| 4,943,497 | A | 7/1990 | Oishi et al. |
| 4,951,697 | A | 8/1990 | Fritts |
| 4,978,947 | A | 12/1990 | Finnegan |
| 5,036,632 | A | 8/1991 | Short, III et al. |
| 5,082,133 | A | 1/1992 | Farwell et al. |
| 5,418,082 | A | 5/1995 | Taki et al. |
| 5,570,803 | A | 11/1996 | Farwell |
| 5,678,307 | A | 10/1997 | Farwell |
| 5,691,073 | A | 11/1997 | Vu et al. |
| 5,705,290 | A | 1/1998 | Azema |
| 5,707,756 | A | 1/1998 | Inoue et al. |
| 5,738,952 | A | 4/1998 | Abe |
| 5,741,606 | A | 4/1998 | Mayer et al. |
| 5,750,277 | A | 5/1998 | Vu et al. |
| 5,800,939 | A | 9/1998 | Mishina et al. |
| 5,821,008 | A | 10/1998 | Harada et al. |
| 5,853,912 | A | 12/1998 | Naing et al. |
| 5,879,832 | A | 3/1999 | Vu et al. |
| 5,879,834 | A | 3/1999 | Mao |
| 5,958,617 | A | 9/1999 | Kozuki et al. |
| 5,962,167 | A | 10/1999 | Nakai et al. |
| 6,033,797 | A | 3/2000 | Mao et al. |
| 6,065,485 | A | 5/2000 | Rooker |
| 6,114,942 | A | 9/2000 | Kitamoto et al. |
| 6,165,637 | A | 12/2000 | Azema |
| 6,204,635 | B1 * | 3/2001 | Sullivan ............ 320/134 |
| 6,228,523 | B1 | 5/2001 | Azema |
| 6,274,264 | B1 | 8/2001 | Azema |
| 6,296,965 | B1 | 10/2001 | Azema |
| 6,296,970 | B1 * | 10/2001 | Killebrew et al. ........ 429/158 |
| 6,346,344 | B1 * | 2/2002 | Song et al. ............ 429/61 |
| 6,376,120 | B1 | 4/2002 | Azema |
| 6,399,237 | B1 | 6/2002 | Souliac et al. |
| 6,403,250 | B1 | 6/2002 | Azema et al. |
| 6,632,572 | B1 | 10/2003 | Takahashi et al. |
| 6,730,430 | B2 | 5/2004 | Chang |
| 6,805,991 | B2 | 10/2004 | Abe |
| 6,878,481 | B2 | 4/2005 | Bushong et al. |
| 6,900,616 | B2 | 5/2005 | Burrus, IV et al. |
| 7,288,920 | B2 | 10/2007 | Bushong et al. |
| 7,335,439 | B2 | 2/2008 | Kawano et al. |
| 2004/0228061 | A1 | 11/2004 | Kim et al. |
| 2004/0232888 | A1 | 11/2004 | Burrus, IV et al. |
| 2004/0234842 | A1 | 11/2004 | Kawano et al. |
| 2005/0214634 | A1 * | 9/2005 | Kim .................. 429/53 |
| 2006/0019150 | A1 | 1/2006 | Rigobert et al. |
| 2006/0115713 | A1 | 6/2006 | Kim et al. |
| 2006/0121336 | A1 | 6/2006 | Yoon |
| 2006/0275657 | A1 | 12/2006 | Kozuki et al. |
| 2007/0026315 | A1 | 2/2007 | Lampe-Onnerud et al. |
| 2007/0298314 | A1 | 12/2007 | Partin et al. |
| 2008/0008928 | A1 | 1/2008 | Partin |
| 2008/0289945 | A1 | 11/2008 | Brazier et al. |
| 2009/0029193 | A1 | 1/2009 | Onnerud et al. |

FOREIGN PATENT DOCUMENTS

| | | |
|---|---|---|
| EP | 0 863 559 A1 | 9/1998 |
| EP | 0 930 662 A2 | 7/1999 |
| EP | 0 969 535 A1 | 1/2000 |
| EP | 1 429 402 A2 | 6/2004 |
| EP | 1 482 577 A1 | 12/2004 |
| EP | 2 038 944 | 3/2009 |
| TW | 200908415 | 2/2009 |
| WO | WO 2006/071972 A2 | 7/2006 |
| WO | WO 2007/149102 A1 | 12/2007 |
| WO | WO 2008/002487 | 1/2008 |
| WO | WO 2008/140702 A3 | 11/2008 |
| WO | WO 2009/002438 | 12/2008 |
| WO | WO 2009/131894 | 10/2009 |

OTHER PUBLICATIONS

Written Opinion of the International Preliminary Examining Authority, PCT/US2007/014592, 6 pp., Date of Mailing Sep. 22, 2008.

PCT International Preliminary Report on Patentability, PCT/US2007/014592, 14 pp., Date of Completion of Report Oct. 28, 2008.

PCT International Search Report and PCT Written Opinion of the International Searching Authority, PCT/US2008/007666, Date of Mailing Oct. 13, 2008.

* cited by examiner

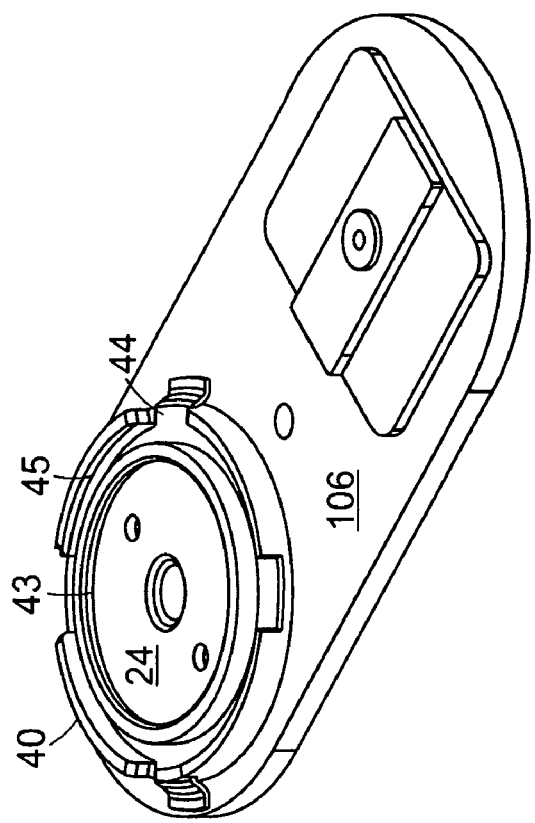
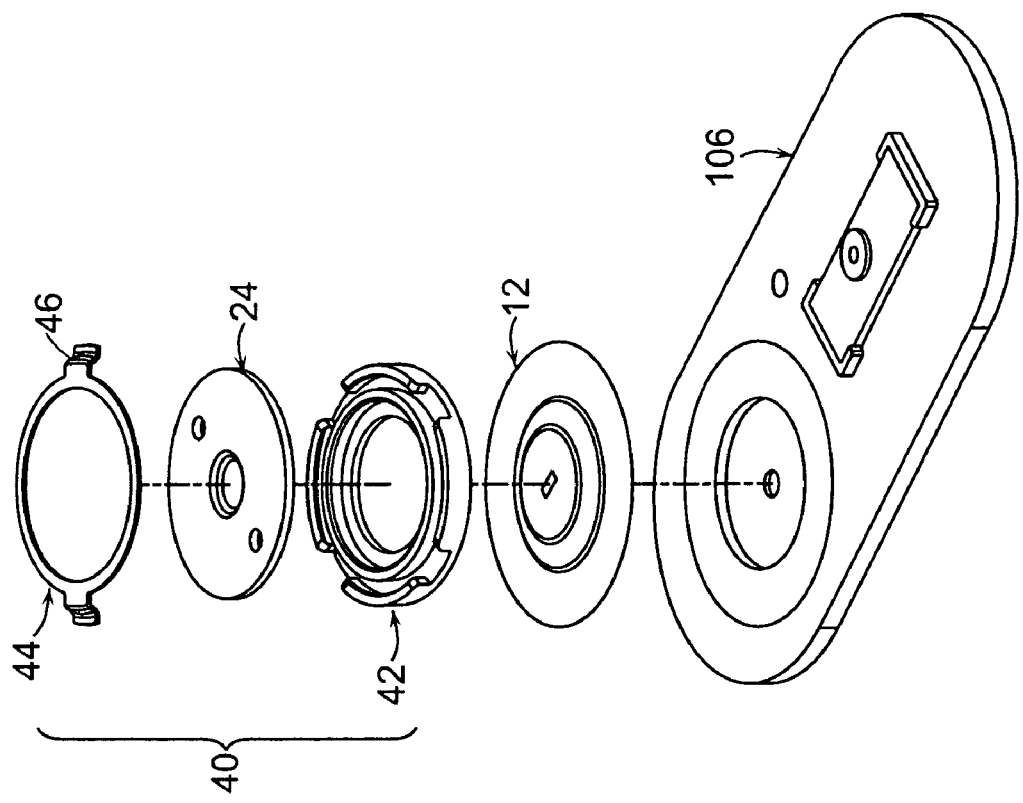

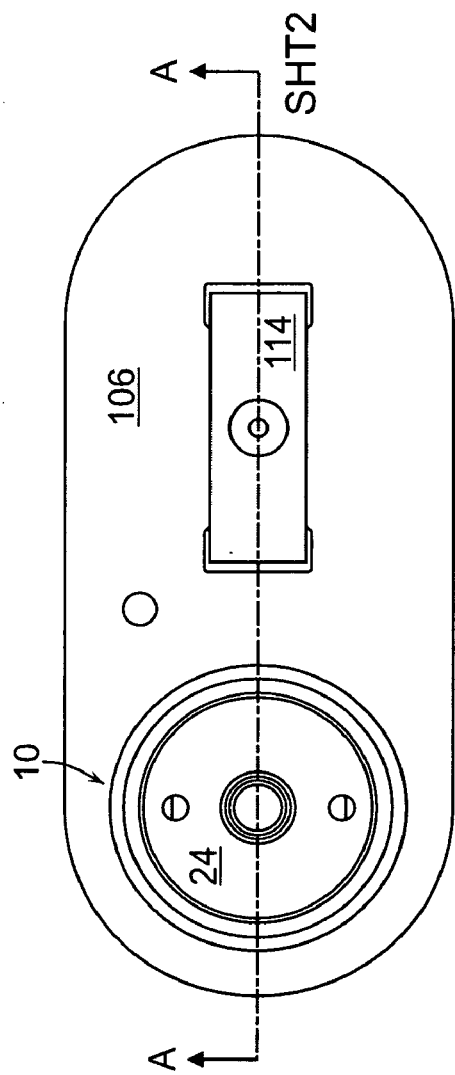
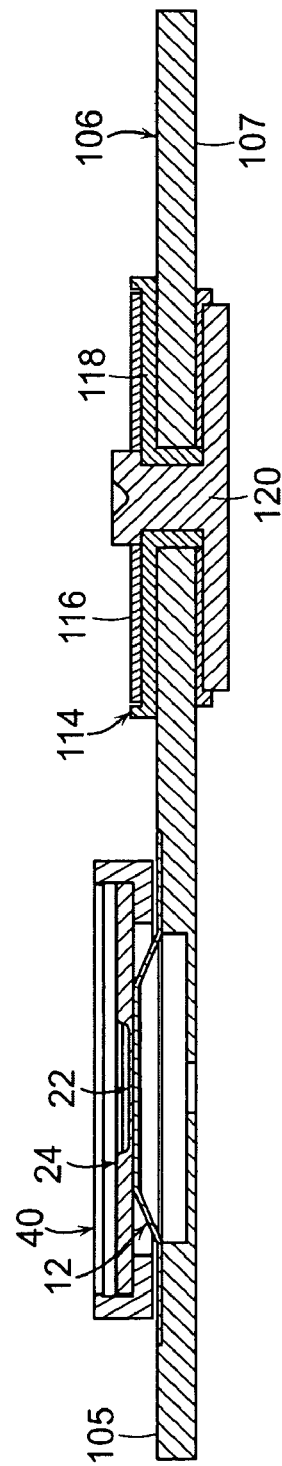
FIG. 8B
FIG. 8C

CID RETENTION DEVICE FOR LI-ION CELL

RELATED APPLICATION

This application claims the benefit of U.S. Provisional Application No. 60/936,825, filed Jun. 22, 2007. The entire teachings of the above application are incorporated herein by reference.

BACKGROUND OF THE INVENTION

Li-ion batteries in portable electronic devices typically undergo different charging, discharging and storage routines based on their use. Batteries that employ Li-ion cell chemistry may produce gas when they are improperly charged, shorted or exposed to high temperatures. This gas can be combustible and may compromise the reliability and safety of such batteries. A current interrupt device (CID) is typically employed to provide protection against any excessive internal pressure increase in a battery by interrupting the current path from the battery when pressure inside the battery is greater than a predetermined value. The CID typically includes first and second conductive plates in electrical communication with each other. The first and second conductive plates are, in turn, in electrical communication with an electrode and a terminal of the battery, respectively. The second conductive plate separates from (e.g., deforms away or is detached from) the first conductive plate of the CID when pressure inside the battery is greater than a predetermined value, whereby a current flow between the electrode and the terminal is interrupted.

Generally, however, CIDs known in the art activate at a relatively high pressure, for example, at an internal gauge pressure greater than about 15 kg/cm$^2$. Typically, when any excessive internal pressure increase that triggers such CID activation occurs, the internal temperature of the battery is also relatively high, causing additional safety issues. High temperatures are a particular concern in relatively large cells, such as cells larger than "18650" cells (which has an outer diameter of about 18 mm and a length of 65 mm).

Therefore, there is a need for CIDs for batteries, particularly relatively large batteries, that can reduce or minimize the aforementioned safety issues.

SUMMARY OF THE INVENTION

The present invention generally relates to a low pressure CID, to a battery, such as a lithium-ion battery, comprising such a low pressure CID, to a method of manufacturing such a low pressure CID, and to a method of manufacturing such a battery. The CID typically includes a first conductive plate and a second conductive plate in electrical communication with the first conductive plate. The electrical communication can be interrupted when a gauge pressure between the plates is in a range of, for example, between about 4 kg/cm$^2$ and about 10 kg/cm$^2$ or between about 4 kg/cm$^2$ and about 9 kg/cm$^2$.

In one embodiment, the present invention is directed to a CID comprising a first conductive plate and a second conductive plate. The first conductive plate includes a frustum having a first end and a second end, a base extending radially from a perimeter of the first end of the frustum, and an essentially planar cap sealing the second end of the frustum. The first end has a broader diameter than the second end. The second conductive plate is in electrical contact with the essentially planar cap, preferably through a weld.

In another embodiment, the present invention is directed to a battery, preferably a lithium-ion battery, that includes at least one CID as described above. The battery further includes a battery can having a cell casing and a lid which are in electrical communication with each other. The battery further includes a first terminal and a second terminal. The first and second terminals are in electrical communication with a first electrode and a second electrode, of the battery, respectively. In the battery, the base of the CID is proximal to the battery can, such as the cell casing or the lid, and the essentially planar cap is distal to the cell can. The battery can is electrically insulated from the first terminal, and at least a portion of the battery can is at least a component of the second terminal, or is electrically connected to the second terminal.

In yet another embodiment, the present invention is directed to a lithium-ion battery comprising a CID that includes a first conductive plate and a second conductive plate. The second conductive plate is in electrical communication with the first conductive plate. The lithium-ion battery further includes a battery can that includes a cell casing and a lid that are in electrical communication with each other. The first conductive plate of the CID is in electrical communication with the battery can. This electrical communication is interrupted when a gauge pressure between the plates is in a range of between about 4 kg/cm$^2$ and about 9 kg/cm$^2$.

The present invention also includes a method of manufacturing a CID. The method includes the steps of forming a first conductive plate and forming a second conductive plate. The first conductive plate includes a frustum having a first end and a second end, a base extending radially from a perimeter of the first end of the frustum, and an essentially planar cap sealing the second end. The first end of the frustum has a broader diameter than the second end of the frustum. The method of manufacturing a CID further includes welding the second conductive plate onto the essentially planar cap of the first conductive plate while a temperature of the first conductive plate is controlled so as not to exceed the melting point of a surface of the first conductive plate opposite the weld.

The present invention also includes a method of manufacturing a battery of the invention as described above. The method includes forming a CID and attaching either a first electrode or a second electrode of the battery to the CID. The formation of the CID includes forming a first conductive plate that includes a frustum, having a first end and a second end having a diameter less than that of the first end, a base extending radially from a perimeter of the first end of the frustum, and an essentially planar cap sealing the second end of the frustum. The formation of the CID further includes forming a second conductive plate, and welding the second conductive plate onto the essentially planar cap of the first conductive plate. The welding is performed while a temperature of the first conductive plate is controlled so as not to exceed the melting point of a surface of the first conductive plate opposite the weld. The method further includes attaching the CID to a battery can including a cell casing and a lid, i.e., either to the cell casing or to the lid. The method further includes forming a first terminal in electrical communication with the first electrode, and a second terminal in electrical communication with the second electrode.

A method of manufacturing a lithium-ion battery of the invention, as described above, is also included in the present invention. The method includes forming a battery can that includes a cell casing and a lid that are in electrical communication with each other. A CID is formed. The formation of the CID includes forming a first conductive plate, forming a second conductive plate, and welding the second conductive plate onto the first conductive plate while a temperature of the first conductive plate is controlled not to exceed the melting point of a surface of the first conductive plate opposite the weld. The weld connecting the first conductive plate and the second conductive plate ruptures when a gauge pressure between the first and second conductive plates is in a range of between about 4 kg/cm$^2$ and about 9 kg/cm$^2$. Either a first electrode or a second electrode of the battery to the CID is attached to the second conductive plate of the CID. The first conductive plate of the CID is attached to a battery can (i.e., either to the cell casing or to the lid). At least one venting means is formed on the cell casing of the cell can, through which gaseous species inside the battery exit when an internal gauge pressure of the battery is in a range of between about 12 kg/cm$^2$ and about 20 kg/cm$^2$. The method of manufacturing a lithium-ion battery further includes welding the lid onto the cell casing. The weld connecting the lid and the cell casing ruptures when a gauge pressure between the first and second conductive plates is equal to, or greater than, about 20 kg/cm$^2$. In a specific embodiment, the weld connecting the lid and the cell casing ruptures when a gauge pressure between the first and second conductive plates is equal to, or greater than, about 23 kg/cm$^2$ or about 25 kg/cm$^2$. The method of manufacturing a lithium-ion battery further includes forming a first terminal in electrical communication with the first electrode, and a second terminal in electrical communication with the second electrode.

Also includes in the present invention is a battery pack that includes a plurality of batteries as described above.

In the batteries of the present invention, the current interrupt device can be activated at a relatively low gauge pressure, e.g., between about 4 kg/cm$^2$ and about 10 kg/cm$^2$, and interrupt internal current flow of the batteries. Applicants have discovered that, when the low pressure CID of the invention activates at a gauge pressure of between about 4 kg/cm$^2$ and about 10 kg/cm$^2$, the average cell skin temperature in lithium-ion batteries, which have a prismatic "183665" configuration and employ a mixture of $Li_{1+x}CoO_2$ ($0 \leq x \leq 0.2$) and $Li_{1+x9}Mn_{(2-y9)}O_4$ ($0.05 \leq x9$, $y9 \leq 0.15$), can be less than about 60° C. For example, during an overcharge tests of these lithium-ion batteries at a voltage greater than about 4.2 V, the CID of the invention activated at about between 4 kg/cm$^2$ and about 10 kg/cm$^2$, and the cell skin temperature at that time was in a range of between about 50° C. and about 60° C. The "183665" prismatic cell has an about 18 mm×36 mm prismatic base and a length of about 65 mm, which is about twice the size of the conventional "18650" cell. Thus, the present invention can provide batteries, especially relatively large batteries, having much improved safety, and battery packs including such batteries.

In addition, the present invention can provide batteries or battery packs that can be charged at their maximum voltage, e.g., 4.2 V per block of series of cells, i.e., having their full capacity. Safety concerns generally relate to a relatively high temperature associated with the exothermic cell chemistry of the $Li_{1+x}CoO_2$-based systems at a higher charging voltage. With conventional CIDs, which generally interrupt the internal current flow of batteries at an internal gauge pressure of about 15 kg/cm$^2$, the cell temperature of the batteries may be excessive before the CIDs activate and interrupt the internal current flow. If no means of current interrupt exists, cells or batteries may eventually vent, which can lead to an unsafe situation, because the vented cells or batteries can expel electrolytes which can ignite and cause fire.

The CIDs of the invention, by contrast, can provide a solution to such problems, because they cause batteries or battery packs, in which they are incorporated, to run at their full capacity with lower risk than typically exists in commercially available embodiments, since they interrupt current flow at relatively low temperatures during overcharge. Thus, the batteries and battery packs of the invention can employ relatively large cells, and provide improved capacity with greater safety by reducing likelihood of thermal runaway in the cells when they are exposed to abuse conditions, such as an overcharge.

In some embodiments of the invention, the low pressure CID is in electrical communication with the battery can. This design can provide improved battery safety particularly in a battery that does not use a crimped cap design. Batteries using crimped cap designs (e.g. steel can cylindrical 18650s found in the market today) often are affected by manufacturing and safety issues surrounding the can assembly and materials, including the facts that such cans use iron-containing materials that can corrode over time and that the crimping process is known to be a possible source of metal contamination in such cells. CID devices, used in such conventional batteries, are crimped into the battery can, and are electrically insulated from the battery can. While use of non-crimped battery designs are known, including use of prismatic Al cans, no CIDs have been developed for use in such cells unless incorporated by some means of crimping. Additionally, use of crimping methods to incorporate CIDs generally is not an efficient utilization of space, which is one of a key design consideration for batteries. In contrast, the present invention enables incorporation of the low pressure CID in a non-crimped battery can by means other than crimping, partly due to the fact that the CID is in electrical communication with the battery can. This also enables similar materials to be used in the construction of the CID and the can (e.g. Al), and eliminates concerns associated with iron-containing cans.

In some other embodiments, the present invention employs a CID that includes a conical section, such as a frustum-shaped first conductive plate. The frustum-shaped conductive plate can cause the CID to activate at lower pressures than what is found in similarly sized CID devices used today that do not employ such a frustum shape. These lower pressures correlate to improved battery safety, especially with regard to battery safety during an overcharge abuse scenario. In particular, in embodiments where the frustum-shaped first conductive plate has a planar cap sealing an end of the frustum, and the first conductive plate is in electrical communication with the second conductive plate at the planar cap, the planar cap enables the two plates to be welded to each other. Use of suitable welding technique can enable, at least in part, improved control of activation pressure of batteries employing CIDs of the invention, for example, by controlling the position or the number of welding. Also, the CID, employing the frustum-shaped conductive plate, can provide the current interrupt function and occupy a significantly reduced amount of space within the battery, both in terms of overall height and cross-section, so that more space can be used for materials directly related to power generating aspects of the battery. In addition, the invention allows manufacturing of a CID device in an efficient process with consideration to time, cost and quality. Particularly with regards to quality, the frustum-shape enables the CID device of the invention to achieve pressure activation in a narrow range and therefore allows better battery design of the battery.

BRIEF DESCRIPTION OF THE DRAWINGS

FIGS. 2A-2C show one embodiment of a first conductive plate of the CID of FIG. 1, wherein FIG. 2A shows a side view of the first conductive plate, FIG. 2B shows a top view of the first conductive plate, and FIG. 2C shows a cross-sectional view of the first conductive plate along line A-A of FIG. 2B.

FIGS. 3A-3C show one embodiment of a second conductive plate of the CID of FIG. 1, wherein FIG. 3A shows a plane view of the second conductive plate, FIG. 3B shows a perspective view of the second conductive plate, and FIG. 3C shows a cross-sectional view of the second conductive plate along line A-A of FIG. 3A.

FIGS. 6A and 6B show one embodiment of the CID of the invention, wherein FIG. 6A shows an assembly of a first conductive plate, a second conductive plate and a retainer between them onto an end plate, and FIG. 6B shows the assembled CID.

FIGS. 7A and 7B show another embodiment of the CID of the invention, wherein FIG. 7A shows an assembly of a first conductive plate, a second conductive plate and a retainer between them onto an end plate, and FIG. 7B shows the assembled CID.

FIG. 8B shows a bottom view of a lid portion of the battery of FIG. 8A, taken from the inside of the battery.

FIG. 8C shows a cross sectional view of the lid portion of FIG. 8B along the line A-A.

DETAILED DESCRIPTION OF THE INVENTION

Figure 1:
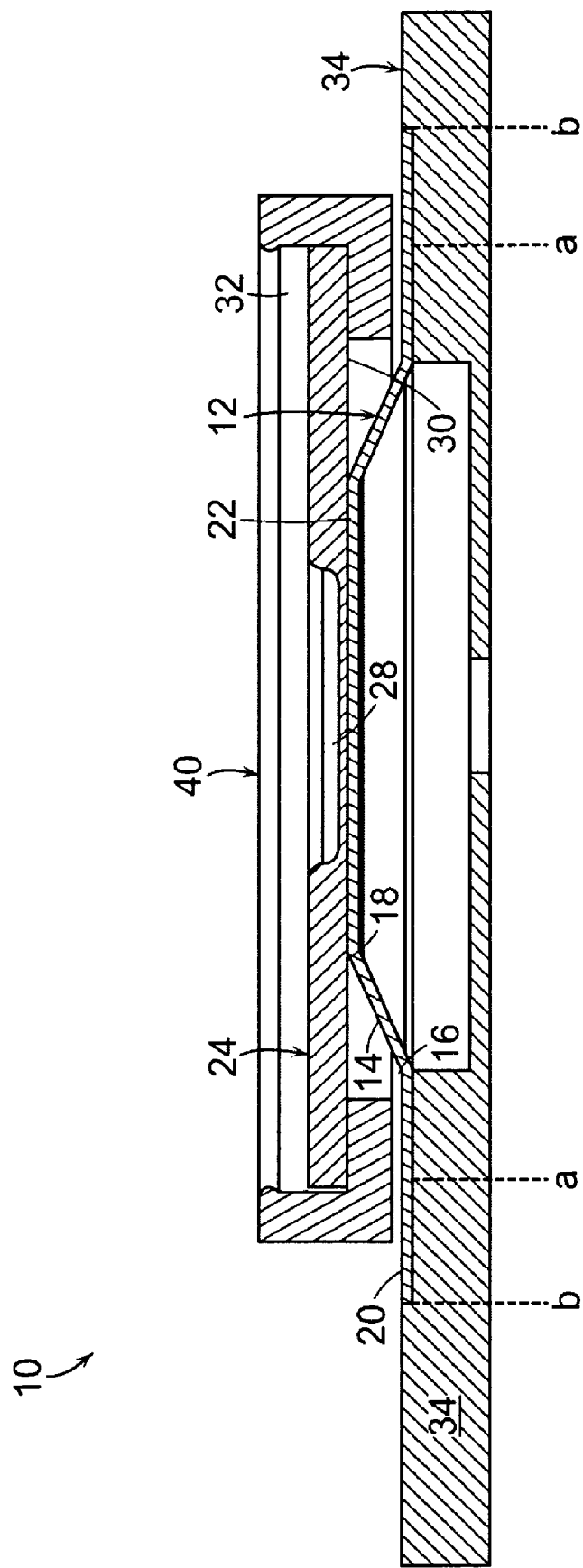
FIG. 1 is a schematic view of a CID of the invention.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

As used herein, the "terminals" of the batteries of the invention mean the parts or surfaces of the batteries to which external electric circuits are connected.

The batteries of the invention typically include a first terminal in electrical communication with a first electrode, and a second terminal in electrical communication with a second electrode. The first and second electrodes are contained within the cell casing of a battery of the invention, for example, in a "jelly roll" form. The first terminal can be either a positive terminal in electrical communication with a positive electrode of the battery, or a negative terminal in electrical communication with a negative electrode of the battery, and vice versa for the second terminal. Preferably, the first terminal is a negative terminal in electrical communication with a negative electrode of the battery, and the second terminal is a positive terminal in electrical communication with a positive electrode of the battery.

As used herein, the phrase "electrically connected" or "in electrical communication" or "electrically contacted" means certain parts are in communication with each other by flow of electrons through conductors, as opposed to electrochemical communication which involves flow of ions, such as $Li^+$, through electrolytes.

The CID of the battery of the invention can active at an internal gauge pressure in a range of, for example, between about 4 $kg/cm^2$ and about 10 $kg/cm^2$, such as between about 4 $kg/cm^2$ and about 9 $kg/cm^2$, between about 5 $kg/cm^2$ and about 9 $kg/cm^2$ or 7 $kg/cm^2$ and about 9 $kg/cm^2$. As used herein, "activation" of the CID means that current flow of an electronic device through the CID is interrupted. In a specific embodiment, the CID of the invention includes a first conductive plate and a second conductive plate in electrical communication with each other (e.g., by welding, crimping, riveting, etc.). In this CID, "activation" of the CID means that the electrical communication between the first and second conductive plates is interrupted. Preferably, when the second conductive plate separates from (e.g., deforms away or is detached from) the first conductive plate, no rupture occurs in the first conductive plate.

In some embodiments, the CID of the battery of the invention, which employs a first conductive plate and a second conductive plate that is in electrical communication with, and pressure (i.e., fluid such as gas) communication with, the first conductive plate and with the battery can of the battery, activates at an internal gauge pressure in a range of, for example, between about 4 $kg/cm^2$ and about 9 $kg/cm^2$, such as between about 5 $kg/cm^2$ and about 9 $kg/cm^2$ or 7 $kg/cm^2$ and about 9 $kg/cm^2$. In these embodiments, preferably, the first conductive plate includes a cone- or dome-shaped part. More preferably, at least a portion of the top (or cap) of the cone- or dome-shaped part is essentially planar. Preferably, the first and second conductive plates are in direct contact with each other at a portion of the essentially planar cap. More preferably, the first conductive plate includes a frustum having an essentially planar cap.

Figure 2B:
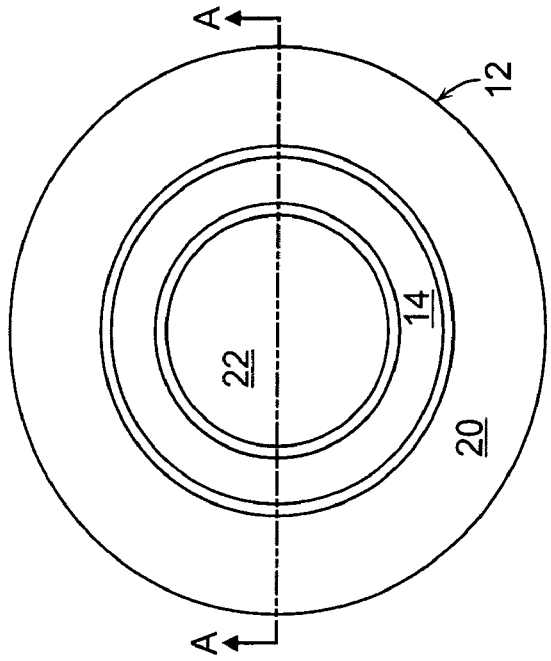
Figure 2A:
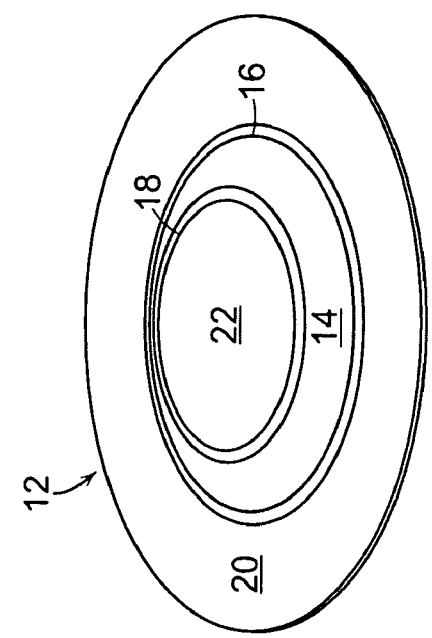
Figure 2C:
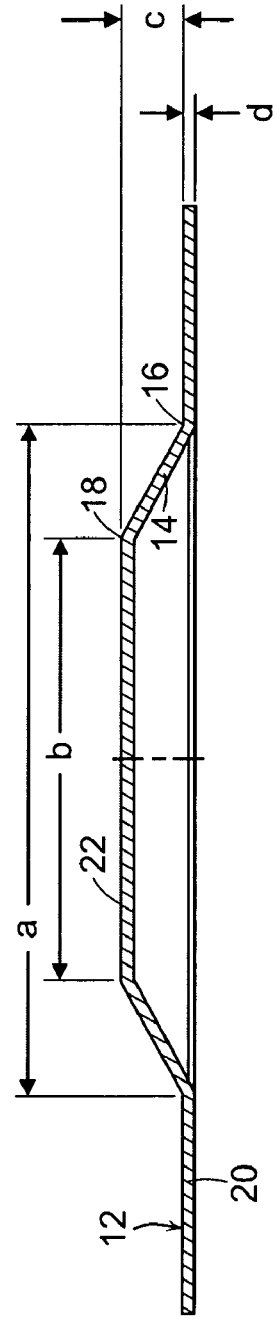

FIG. 1 shows one specific embodiment of the CID of the invention. CID 10 shown in FIG. 1 includes first conductive plate 12 and second conductive plate 24. As shown in FIGS. 2A-2C, first conductive plate 12 includes frustum 14 that includes first end 16 and second end 18. First end 16 has a broader diameter than second end 18. First conductive plate 12 also includes base 20 extending radially from a perimeter of first end 16 of frustum 14. Essentially planar cap 22 seals second end 18 of frustum 14. As used herein, the term "frustum" means the basal wall part (excluding the bottom and top ends) of a solid right circular cone (i.e., solid generated by rotating a right triangle about one of its legs) by cutting off the top intersected between two parallel planes.

As used herein, the term "essentially planar cap" means a planar cap which includes a surface that sufficiently resembles a plane to potentially contact a planar surface randomly at more than one point and whereby the planar cap and the planar surface can be fused by a suitable means, such as by spot welding. In some embodiments, deformation of the essentially planar cap caused by assembly or by fabrication of the first conductive plate having the essentially planar cap to form CID 10 (e.g., by welding of first conductive plate 12 to second conductive plate 24) is considered to be essentially planar.

Preferably, flat cap 22 and/or base 20 has a thickness (indicated with reference character "d" in FIG. 2C) in a range of between about 0.05 millimeters and about 0.5 millimeters, such as between about 0.05 millimeters and about 0.3 millimeters, between about 0.05 millimeters and 0.2 millimeters, between about 0.05 millimeters and about 0.15 millimeters (e.g., about 0.127 millimeter (or about 5 milli-inch)).

Preferably, the diameter of flat cap 22 (indicated with reference character "b" in FIG. 2C) is in a range of between about 2 millimeters and about 10 millimeters, more preferably between 5 millimeters and about 10 millimeters, even more preferably between about 5 millimeters and 8 millimeters (e.g., between about 0.20 inches and 0.25 inches), such as about 5.5 millimeter (or about 0.215 inch).

Preferably, the height of essentially planar cap 22 from base 20 (indicated with reference character "c" in FIG. 2C) is in a range of between about 0.5 millimeter and about 1 millimeter, more preferably between about 0.6 millimeter and about 0.8 millimeter, such as about 0.762 millimeter (or about 0.315 inch).

Preferably, frustum 14 has an angle relative to a plane parallel to base 20 in a range of between about 15 degrees and about 25 degrees, such as between about 18 degrees and about 23 degrees, or between about 19 degrees and about 21 degrees. More preferably, frustum 14 has an angle of about 21 degrees relative to a plane parallel to base 20. Preferably, frustum 14 has a diameter ratio of first end 16 to second end 18 (i.e., ratio of "b" to "a" in FIG. 2C) in a range of between about 1:1.20 and about 1:1.35, such as between about 1:1.23 and about 1:1.28.

Figure 3B:
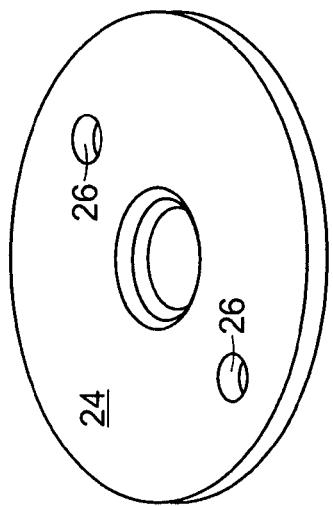
Figure 3C:
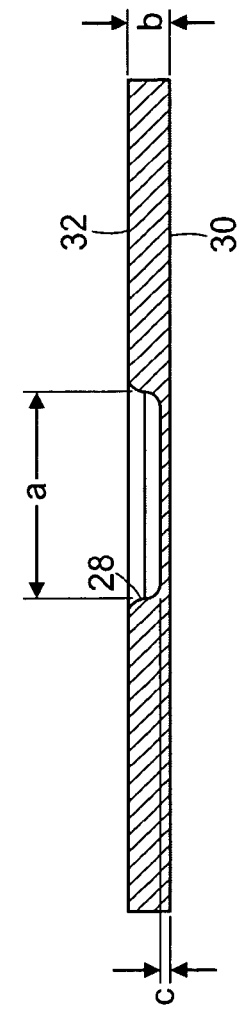
Figure 3A:
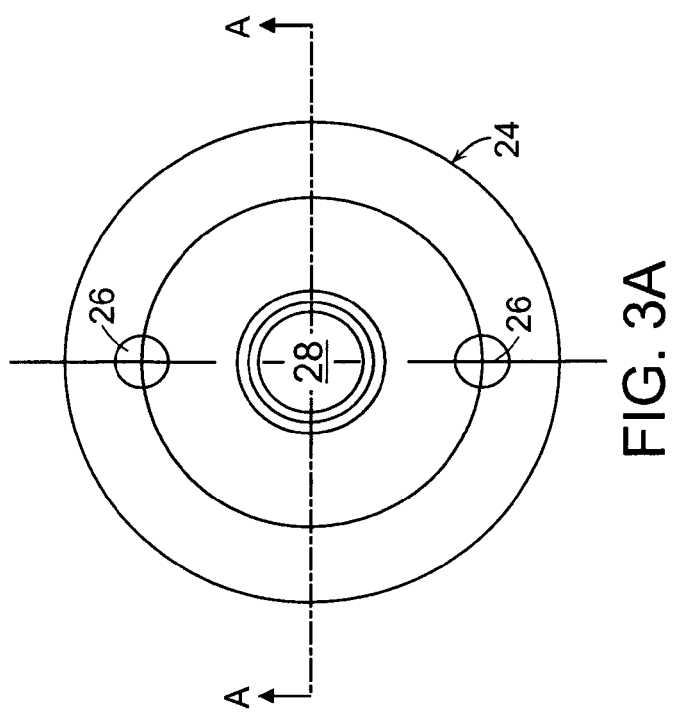

Second conductive plate 24 is in electrical and pressure (i.e., fluid such as gas) communication with first conductive plate 12. Preferably, second conductive plate 24 defines at least one opening 26 through which first conductive plate 12 and second conductive plate 24 are in pressure communication with each other. One embodiment of such second conductive plate 24 is shown in FIGS. 3A-3C. As shown in FIGS. 3A and 3B, second conductive plate 24 defines at least one opening 26 through which first conductive plate 12 and second conductive plate 24 are in pressure (e.g., gas) communication with each other. Preferably, second conductive plate 24 includes emboss (or depression) 28, and, thus, has flat side 30 and depression side 32 (FIG. 3C). Referring back to FIG. 1, flat side 30 of second conductive plate 24 faces toward first conductive plate 12. Second conductive plate 24 is in electrical contact with essentially planar cap 22 of first conductive plate 12, preferably through a weld. Preferably, the weld connecting essentially planar cap 22 of first conductive plate 12 and second conductive plate 24 is at flat side 30 at depression 28. Preferably, the weld is at least one spot weld, such as one, two, three or four. More preferably, at least one of the spot welds includes aluminum. Even more preferably, the weld is two spot welds. Preferably, the two spot welds are separated from each other.

Any suitable welding technique known in the art can be used to weld first and second conductive plates 12 and 24. Preferably, a laser welding technique is employed in the invention. More preferably, during the welding process (e.g., laser welding process), a temperature of first conductive plate 12 is controlled so as not to exceed the melting point of a surface of the first conductive plate opposite the weld. Such controlling can be done using any suitable cooling methods known in the art. Preferably, the thickness of second conductive plate 24 proximate to the weld with first conductive plate 12 is equal to or greater than one-half of the thickness of first conductive plate 12 proximate to the weld, but less than the thickness of the first conductive plate proximate to the weld.

Figure 4:
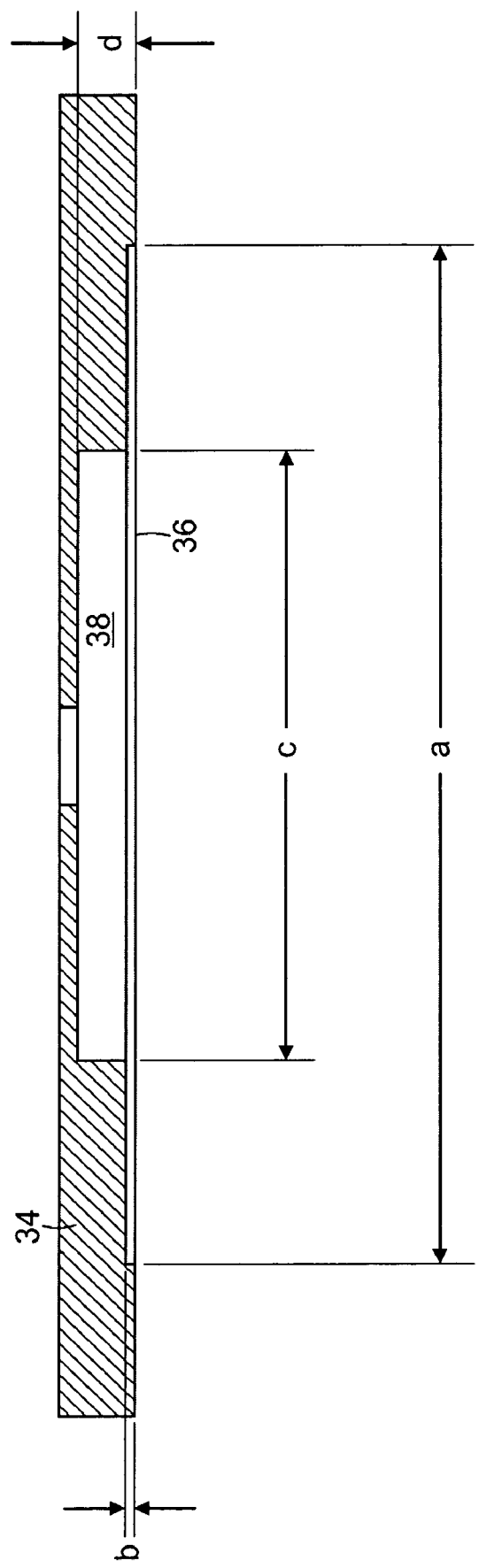
FIG. 4 show one embodiment of an end plate which can house the CID of FIG. 1.
Figure 5A:
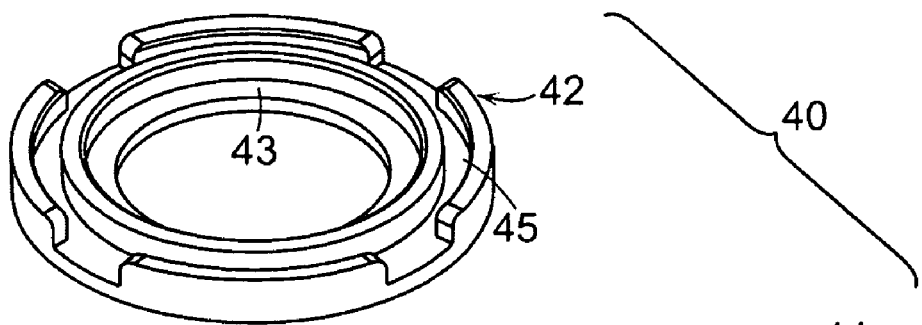
FIGS. 5A-5C show one embodiment of a retainer disposed between a portion of a first conductive plate and a portion of a second conductive plate, of the CID of FIG. 1, wherein an insulator component of the retainer is shown in FIG. 5A, a side view of a ring component of the retainer is shown in FIG. 5B, and a top view of the ring of the retainer is shown in FIG. 5C.
Figure 5B:
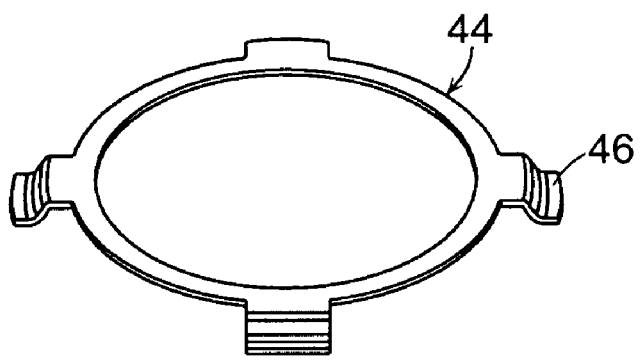
Figure 5C:
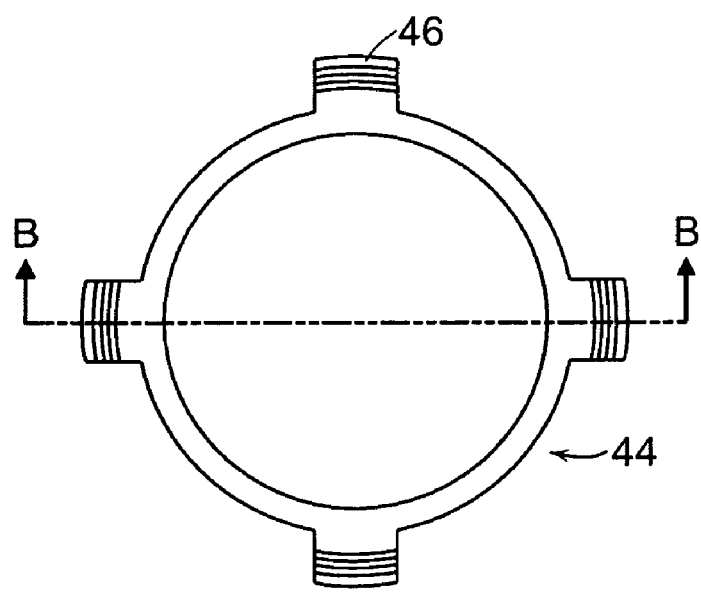

Referring back to FIG. 1, CID 10 optionally includes end plate 34. One particular embodiment of end plate 34 is shown in FIG. 4. End plate 34 includes first recess 36 and second recess 38. The diameter of first recess 36 (indicated with reference character "a" in FIG. 4) is preferably co-terminus with the outer diameter of base 20 of first conductive plate 12 (as shown in FIG. 1). As used herein, the "co-terminus" means that the diameter of first recess 36 is essentially the same as, or slightly larger than the outer diameter of base 20 of first conductive plate 12 by between about 101% and about 120% (e.g., about 110%). The depth of first recess 36 (indicated with reference character "b" in FIG. 4) is slightly less, for example, about 90% less, than the thickness of base 20 of first conductive plate 12 (indicated with reference character "d" in FIG. 2C). Second recess 38 can accommodate frustum 14 of first conductive plate 12 upon its reversal. This second recess 38 is preferably co-terminus with the perimeter of first end 16 of frustum 14 of first conductive plate 12 (as shown in FIG. 1). As used herein, the "co-terminus" means that the diameter (indicated with reference character "c" in FIG. 4) of second recess 38 is essentially the same as, or slightly larger than that of cap 22 of frustum 14, by between about 101% and about 120% (e.g., about 103%). The depth of second recess 38 (indicated with reference character "d" in FIG. 4), as measured from first recess 36, is slightly larger, for example, between about 110% and about 130% (e.g., about 125%) larger, than the height of first conductive plate 12 (indicated with reference character "c" in FIG. 2C).

As shown in FIG. 1, first conductive plate 12 and end plate 34 are in electrical contact with each other. This electrical contact can be made by any suitable method known in the art, for example, by welding, crimping, riveting, etc. Preferably, first conductive plate 12 and end plate 34 are welded to each other. Any suitable welding technique known in the art can be used. Preferably, first conductive plate 12 and end plate 34 are hermetically joined. Preferably, a laser welding techniques is employed in the invention. More preferably, a circumferential laser welding technique is used to hermetically join first conductive plate 12 and end plate 34, for example, either by means of seam welding at the circumferential interface between the two parts or by means of penetration welding at base 20 of first conductive plate 12. Preferably, the welding is circumferentially placed around the middle of base 20 or the edge of base 20 (indicated with reference characters "a" and "b," respectively, in FIG. 1). Preferably, during the welding process (e.g., laser welding process), a temperature of first conductive plate 12 is controlled so as not to exceed the melting point of a surface of the first conductive plate opposite the weld. Such temperature control can be obtained using any suitable cooling method known in the art.

First conductive plate 12, second conductive plate 24 and end plate 34 can be made of any suitable conductive material known in the art for a battery. Examples of suitable materials include aluminum, nickel and copper, preferably aluminum, such as Aluminum 3003 series (e.g., Aluminum 3003H-14 series for second conductive plate 24 and end plate 34, and Aluminum 3003H-0 series for first conductive plate 12). Preferably, first conductive plate 12 and second conductive plate 24 are made of substantially the same metals. More preferably, first conductive plate 12, second conductive plate 24 and end plate 36 are made of substantially the same metals. As used herein, the term "substantially same metals" means metals that have substantially the same chemical and electrochemical stability at a given voltage, e.g., the operation voltage of a battery. In one specific embodiment, at least one of first conductive plate 12 and second conductive plate 24 includes aluminum, such as Aluminum 3003 series. In one more specific embodiment, first conductive plate 12 includes aluminum which is softer than that of second conductive plate. Preferably, first conductive plate 12 and second conductive plate 24 both include aluminum. Even more preferably, first conductive plate 12, second conductive plate 24 and end plate 36 all include aluminum, such as Aluminum 3003 series.

Frustum 14 and flat cap 22 of first conductive plate 12, embossment 28 of second conductive plate 24 and recesses 36 and 38 of end plate 34 can be made by any suitable method known in the art, for example, by stamping, coining, and/or milling techniques.

Referring back to FIG. 1, in a preferred embodiment, the CID of the invention further includes retainer 40 (e.g., electrically insulating layer, ring or gasket) between a portion of first conductive plate 12 and a portion of second conductive plate 24. Retainer 40, such as an electrically insulating ring, extends about the perimeter of frustum 14, and between base 20 of first conductive plate 12 and second conductive plate 24.

One specific embodiment of retainer 40 is shown in FIGS. 5A-5C, and FIGS. 6A and 6B. Retainer 40 of FIGS. 5A-5C, and FIGS. 6A and 6B includes an insulator 42, such as an electrically insulating ring, which defines at least two grooves 43, 45 about a perimeter of the insulator 42. Retainer 40 further includes ring 44, such as a metal ring, having tabs 46. As shown in FIGS. 6A and 6B, ring 44 can rest inside groove 45 and second conductive plate 24 can rest inside groove 43. Tabs 46 can be malleably adjusted and secured to a metal surface of lid 106 (or a surface of an end plate which is a part of the lid), on which first conductive plate 12 is resting, thereby securing ring 44 over first conductive plate 12. As shown in FIGS. 5A and 5B, and 6A and 6B, the number of tabs 46 can be any number, for example, one, two, three or four.

Figure 7B:
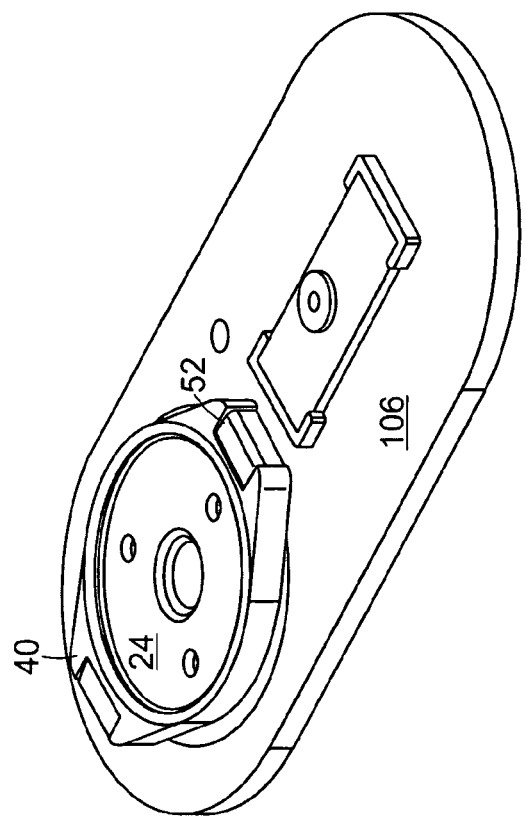
Figure 7A:
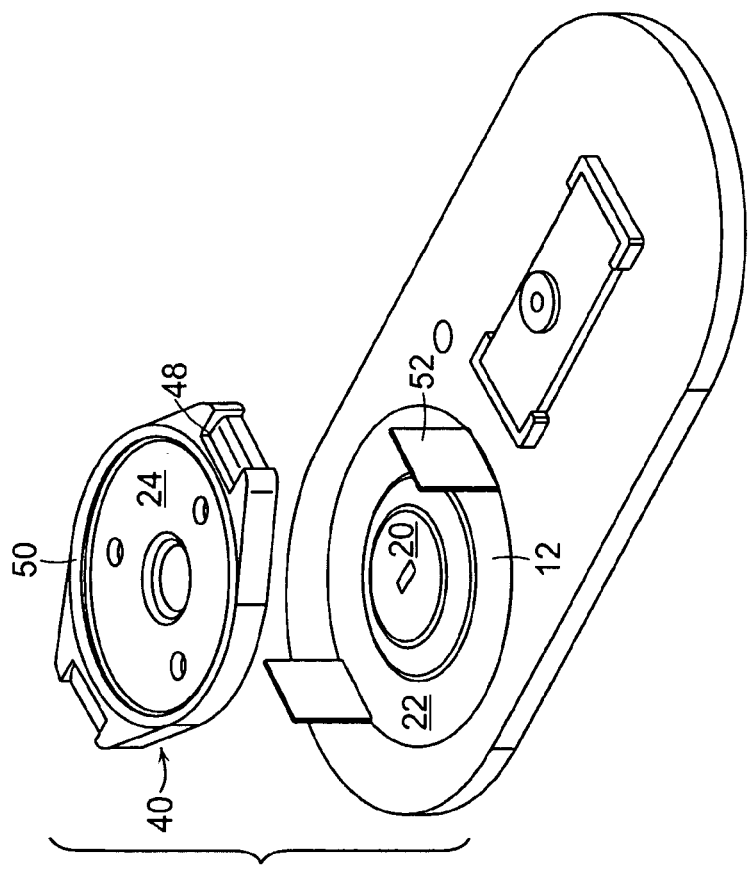

Another specific embodiment of retainer 40 is shown in FIGS. 7A and 7B. Retainer 40 of FIGS. 7A and 7B is an insulator, such as an electrically insulating ring, that defines at least one opening 48 and groove 50 about a perimeter of retainer 40. As shown in FIG. 7A, second conductive plate 24 can rest inside groove 50. In this embodiment, first conductive plate 12 preferably includes at least one tab 52. Tabs 52 of first conductive plate 12, and opening 48 of retainer 40 are capable of alignment when retainer 40 and base 22 of first conductive plate 12 are concentric. Tabs 52 of first conductive plate 12 can be malleably adjusted to secure retainer 40 to first conductive plate 12, as shown in FIG. 7B.

Figure 8A:
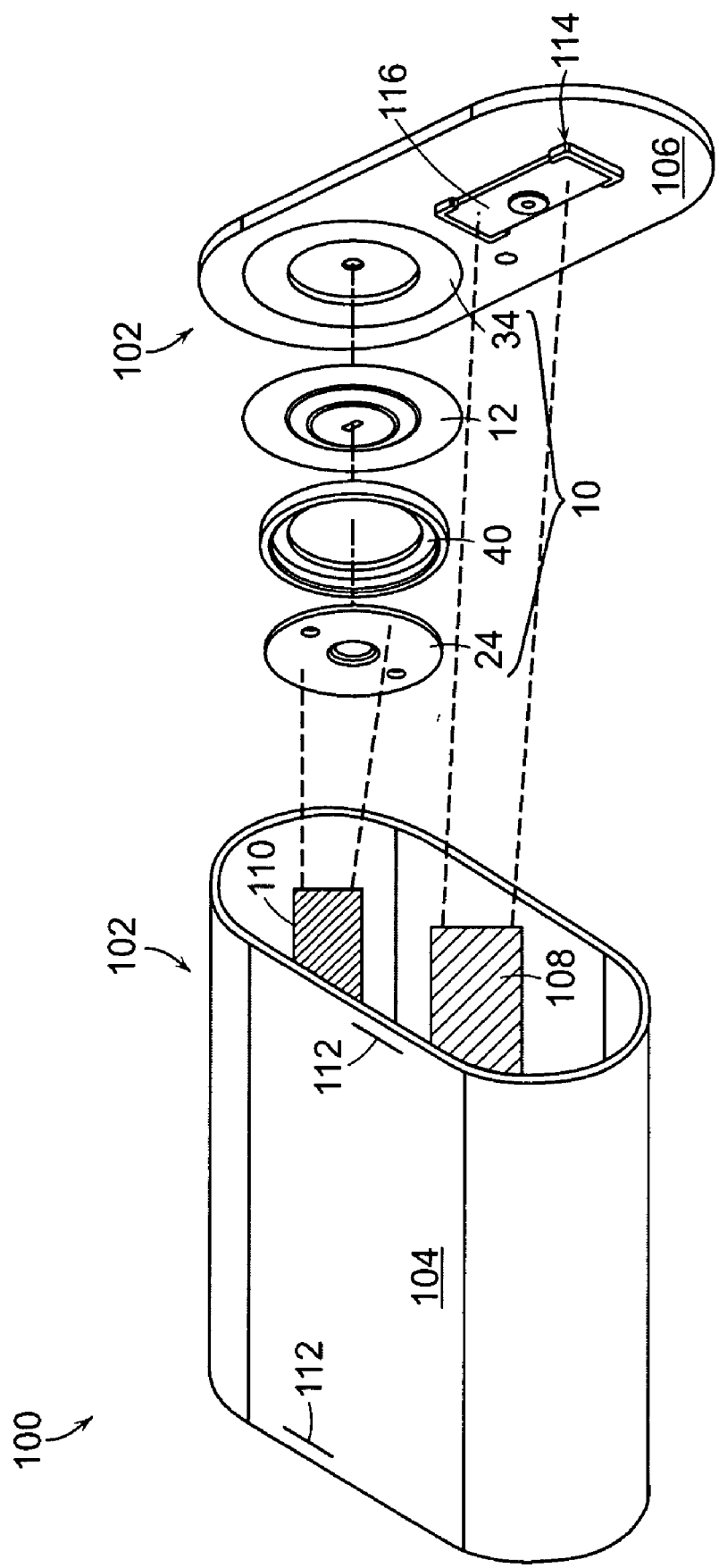
FIG. 8A shows one embodiment in a prismatic format of the battery of the invention.
Figure 8D:
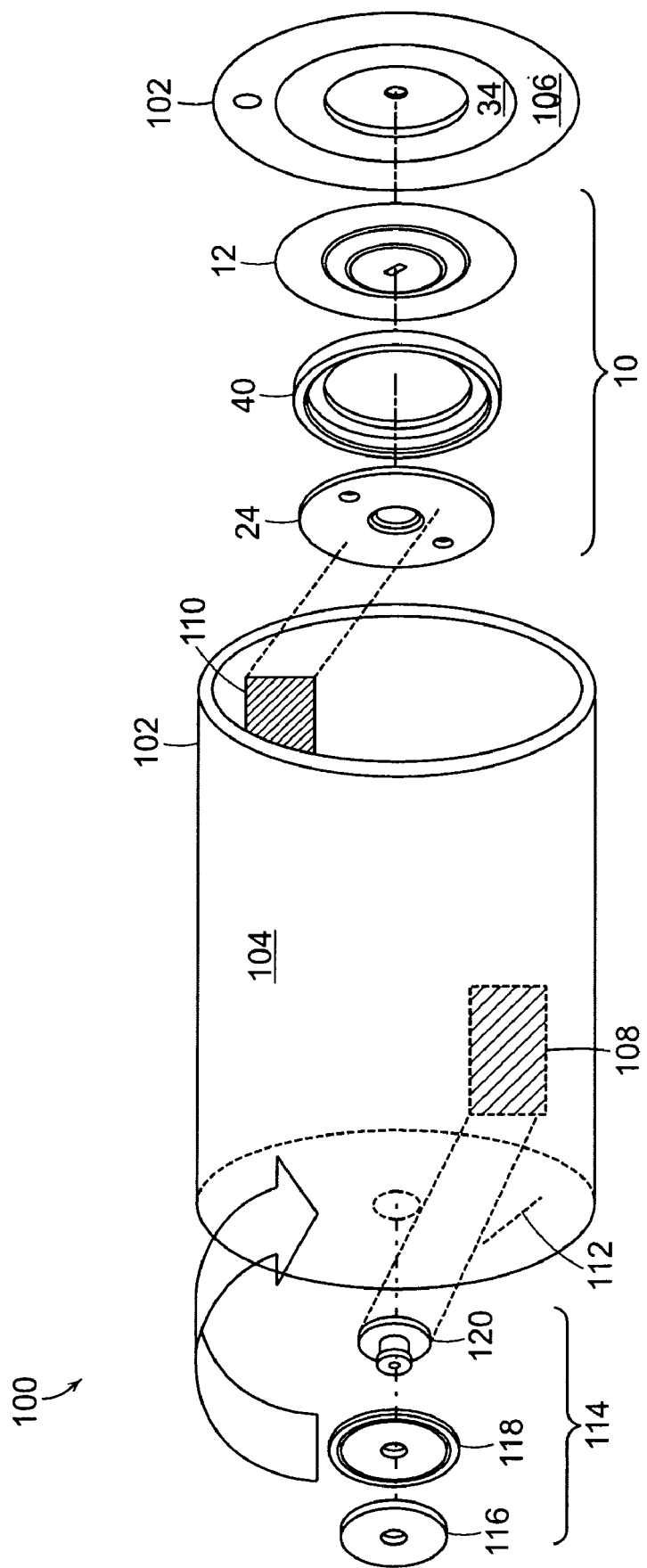
FIG. 8D shows one embodiment of a cylindrical format of the battery of the invention.

The CIDs of the invention, such as CID 10, can be included in a battery, such as a lithium-ion battery. FIGS. 8A and 8D show two different embodiments of battery 100 (which is collectively referred to for battery 100A of FIG. 8A and battery 100B of FIG. 8D) of the battery of the invention. FIG. 8B shows a bottom view of a lid portion of battery 100, including CID 10, when it is seen from the inside of the battery. FIGS. 8C and 8F show a cross-sectional view of the lid portion, of battery 100A of FIG. 8A and, of battery 100B of FIG. 8D, respectively.

As shown in FIGS. 8A-8F, battery 100 includes CID 10, battery can 102 that includes cell casing 104 and lid 106, first electrode 108 and second electrode 110. First electrode 108 is in electrical communication with a first terminal of the battery, and second electrode 110 is in electrical communication with a second terminal of the battery. The cell casing 104 and lid 106 are in electrical contact with each other. The tabs (not shown in FIG. 8A and FIG. 8D) of first electrode 108 are electrically connected (e.g., by welding, crimping, riveting, etc.) to electrically-conductive, first component 116 of feedthrough device 114. The tabs (not shown in FIG. 8A and FIG. 8D) of second electrode 110 are in electrically connected (e.g., by welding, crimping, riveting, etc.) to second conductive plate 24 of CID 10.

Features of CID 10, including preferred features, are as described above. Specifically, in FIGS. 8A-8C and FIGS. 8D-8F, CID 10 includes first conductive plate 12, second conductive plate 24, end plate 34 and retainer 40. As shown in FIG. 8A and FIG. 8D, in battery 100, end plate 34 is a part of lid 106 of cell can 102. Although not shown, separate end plate 34 can be used in the invention. Features, including preferred features, of first conductive plate 12, second conductive plate 24, retainer 40 and end plate 34 are as described above. Preferably, when second conductive plate 24 separates from first conductive plate 12, no rupture occurs in second conductive plate 24 so that gas inside battery 100 does not go out through first conductive plate 24. The gas can exit battery 100 through one or more venting means 112 (see FIG. 8A and FIG. 8D) at cell casing 104, which will be discussed later in detail, when the pressure keeps increasing and reaches a predetermined value for activation of venting means 112. In some embodiments, the predetermined value for activation of venting means 112, which is, for example, an internal gauge pressure in a range of between about 10 kg/cm$^2$ and about 20 kg/cm$^2$, such as between about 12 kg/cm$^2$ and about 20 kg/cm$^2$, is higher than that for the activation of CID 10, for example, between about 4 kg/cm$^2$ and about 10 kg/cm$^2$ or between about 4 kg/cm$^2$ and about 9 kg/cm$^2$. This feature helps prevent premature gas leakage, which can damage neighboring batteries (or cells) which are operating normally. So, when one of a plurality of cells in the battery packs of the invention is damaged, the other healthy cells are not damaged. It is noted that gauge pressure values or sub-ranges suitable for the activation of CID 10 and those for activation of venting means 112 are selected from among the predetermined gauge pressure ranges such that there is no overlap between the selected pressure values or sub-ranges. Preferably, the values or ranges of gauge pressure for the activation of CID 10 and those for the activation of venting means 112 differ by at least about 2 kg/cm$^2$, more preferably by at least about 4 kg/cm$^2$, even more preferably by at least about 6 kg/cm$^2$, such as by about 7 kg/cm$^2$.

CID 10 can be made as described above. Attachment of CID 10 to battery can 102 of battery 100 can be done by any suitable means known in the art. Preferably, CID 10 is attached to battery can 102 via welding, and more preferably by welding first conductive plate 12 onto end plate 34 of lid 106, as described above for the CID of the invention.

Although one CID 10 is employed in battery 100, more than one CID 10 can be employed in the invention. Also, although in FIGS. 8A-8C and FIGS. 8D-8F, CID 10 in electrical contact with second electrode 110 is depicted, in some other embodiments, CID 10 can be in electrical communication with first electrode 108 and feed-through device 114 that is insulated from cell can 102, and second electrode 110 is directly in electrical contact with cell can 102. In such embodiments, CID 10 is not in electrical communication with cell can 102. Also, although in FIGS. 8A-8C and FIGS. 8E-8F, CID 10 is depicted to be positioned at inside 105 of lid 106 (see FIG. 8C and FIG. 8F), CID 10 of the invention can be placed at any suitable place of battery 100, for example, on the side of cell casing 102 or top side 107 of lid 106.

Figure 8E:
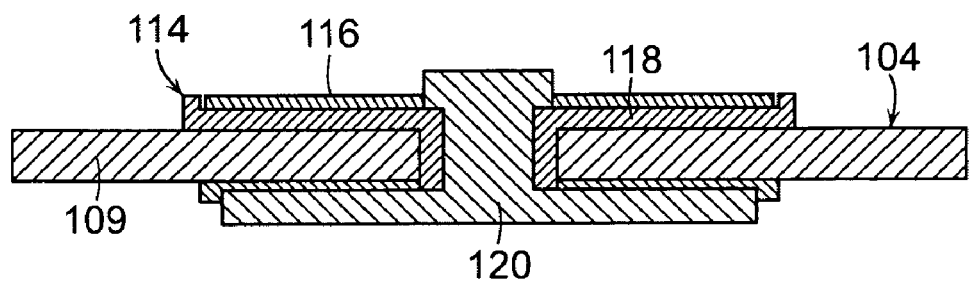
FIG. 8E shows a side view of the bottom can portion of the battery of FIG. 8D from inside of the battery.
Figure 8F:
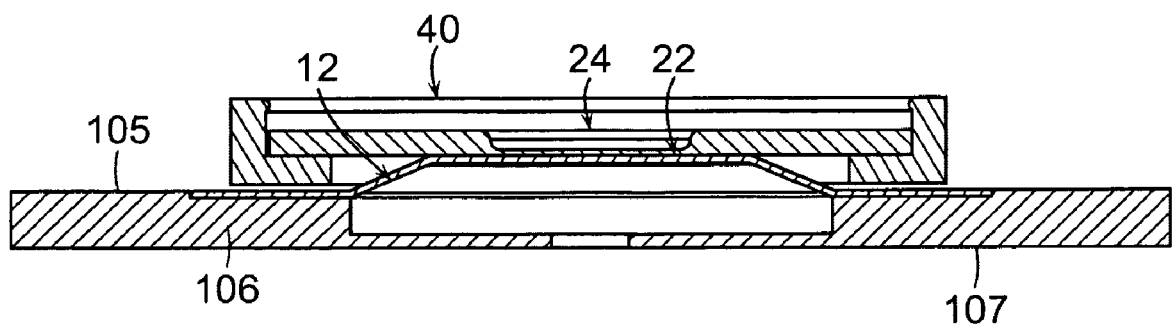
FIG. 8F shows a side view of the top lid portion of the battery of FIG. 8E from inside of the battery.

As shown in FIG. 8C and FIG. 8E, feed-through device 114 includes first conductive component 116, which is electrically conductive, insulator 118, and second conductive component 120, which can be the first terminal of battery 100. As used herein, the term "feed-through" includes any material or device that connects an electrode of a battery within a space defined by a casing and lid of a battery, with a component of the battery external to that defined internal space. Preferably, the feed-through material or device extends through a pass-through hole defined by a lid of the battery. Feed-through device 114 can pass through a lid of a cell casing of a battery without deformation, such as by bending, twisting and/or folding of electrode tabs, and, thus, can increase cell capacity. Such a feed-through device can potentially increase (e.g., 5-15%) cell capacity due to increased volume utilization, as compared to that of a conventional lithium battery in which current-carrying tabs are folded or bent into a cell casing and are welded with internal electrodes. First and second conductive components, 116, 120, can be made of any suitable electrically conductive material, such as nickel. Any suitable insulating materials known in the art can be used for insulator 118.

Cell casing 104 can be made of any suitable conductive material which is essentially stable electrically and chemically at a given voltage of batteries, such as the lithium-ion batteries of the invention. Examples of suitable materials of cell casing 104 include aluminum, nickel, copper, steel, nickel-plated iron, stainless steel and combinations thereof. Preferably, cell casing 104 is of, or includes, aluminum. Examples of suitable materials of lid 106 are the same as those listed for cell casing 104. Preferably lid 106 is made of the same material as cell casing 104. In a more preferred embodiment, both cell casing 104 and lid 106 are formed of, or include, aluminum. Lid 106 can hermetically seal cell casing 104 by any suitable method known in the art (e.g., welding, crimping, etc). Preferably, lid 106 and cell casing 104 are welded to each other. Preferably, the weld connecting lid 106 and cell casing 104 ruptures when an gauge pressure between lid 106 and cell casing 104 is greater than about 20 kg/cm$^2$.

In a preferred embodiment of the battery of the invention, at least one of cell casing 104 and lid 106 of battery can 102 are in electrical communication with second electrode 110 of battery 100 through CID 108, as shown in FIG. 8A and FIG. 8D. Battery can 102 is electrically insulated from first terminal 120, and at least a portion of cell can 102 is at least a component of a second terminal of battery 100, or is electrically connected to the second terminal. In a more preferred embodiment, at least a portion of lid 106 or the bottom end of cell casing 104, serves as the second terminal.

As shown in FIG. 8C and FIG. 8F, at least a portion of battery can 102, e.g., lid 106 or the bottom end of cell casing 104, can be the second terminal of battery 100. Alternatively, at least a portion of battery can 102 can be at least a component of the second terminal, or electrically connected to the second terminal. Lid 106 of cell can 102 is electrically insulated from feed-through device 114 by insulator 118, such as an insulating gasket or ring. The insulator is formed of a suitable insulating material, such as polypropylene, polyvinylfluoride (PVF), natural polypropylene, etc. Preferably, the first terminal is a negative terminal, and the second terminal of battery 100, which is in electrical communication with cell can 102, is a positive terminal.

Referring back to FIG. 8A and FIG. 8D, in some preferred embodiments, cell casing 104 includes at least one venting means 112 as a means for venting interior gaseous species when necessary, such as when gas within lithium ion battery 100 is greater than a value, for example, an internal gauge pressure in a range of between about 10 kg/cm$^2$ and about 20 kg/cm$^2$, such as between about 12 kg/cm$^2$ and about 20 kg/cm$^2$ or between about 10 kg/cm$^2$ and about 18 kg/cm$^2$. It is to be understood that any suitable type of venting means can be employed as long as the means provide hermetic sealing in normal battery operation conditions. Various suitable examples of venting means are described in U.S. Provisional Application No. 60/717,898, filed on Sep. 16, 2005, the entire teachings of which are incorporated herein by reference.

Specific examples of venting means include vent scores. As used herein, the term "score" means partial incision of section(s) of a cell casing, such as cell casing 104, that is designed to allow the cell pressure and any internal cell components to be released at a defined internal pressure. Preferably, venting means 112 is a vent score, more preferably, vent score that is directionally positioned away from a user/or neighboring cells. More than one vent score can be employed in the invention. In some embodiments, patterned vent scores can be employed. The vent scores can be parallel, perpendicular, diagonal to a major stretching (or drawing) direction of the cell casing material during creation of the shape of the cell casing. Consideration is also given to vent score properties, such as depth, shape and length (size).

The batteries of the invention can further include a positive thermal coefficient layer (PTC) in electrical communication with either the first terminal or the second terminal, preferably in electrical communication with the first terminal. Suitable PTC materials are those known in the art. Generally, suitable PTC materials are those that, when exposed to an electrical current in excess of a design threshold, its electrical conductivity decreases with increasing temperature by several orders of magnitude (e.g., $10^4$ to $10^6$ or more). Once the electrical current is reduced below a suitable threshold, in general, the PTC material substantially returns to the initial electrical resistivity. In one suitable embodiment, the PTC material includes small quantities of semiconductor material in a polycrystalline ceramic, or a slice of plastic or polymer with carbon grains embedded in it. When the temperature of the PTC material reaches a critical point, the semiconductor material or the plastic or polymer with embedded carbon grains forms a barrier to the flow of electricity and causes electrical resistance to increase precipitously. The temperature at which electrical resistivity precipitously increases can be varied by adjusting the composition of the PTC material, as is known in the art. An "operating temperature" of the PTC material is a temperature at which the PTC exhibits an electrical resistivity about halfway between its highest and lowest electrical resistance. Preferably, the operating temperature of the PTC layer employed in the invention is between about 70° Celsius and about 150° Celsius.

Examples of specific PTC materials include polycrystalline ceramics containing small quantities of barium titanate ($BaTiO_3$), and polyolefins including carbon grains embedded therein. Examples of commercially available PTC laminates that include a PTC layer sandwiched between two conducting metal layers include LTP and LR4 series manufactured by Raychem Co. Generally, the PTC layer has a thickness in a range of about 50 μm and about 300 μm.

Preferably, the PTC layer includes electrically conductive surface, the total area of which is at least about 25% or at least about 50% (e.g., about 48% or about 56%) of the total surface area of lid 106 or the bottom of battery 100. The total surface area of the electrically conductive surface of the PTC layer can be at least about 56% of the total surface area of lid 106 or the bottom of battery 100. Up to 100% of the total surface area of lid 106 of battery 100 can be occupied by the electrically conductive surface of the PTC layer. Alternatively, the whole, or part, of the bottom of battery 100 can be occupied by the electrically conductive surface of the PTC layer.

The PTC layer can be positioned externally to the battery can, for example, over a lid of the battery can.

In a preferred embodiment, the PTC layer is between a first conductive layer and a second conductive layer and at least a portion of the second conductive layer is at least a component of the first terminal, or is electrically connected to the first terminal. In a more preferred embodiment, the first conductive layer is connected to the feed-through device. Suitable examples of such a PTC layer sandwiched between the first and second conductive layers are described in U.S. patent application Ser. No. 11/474,081, filed on Jun. 23, 2006, the entire teachings of which are incorporated herein by reference.

In a preferred embodiment, the battery of the invention includes battery can 102 that includes cell casing 104 and lid 106, at least one CID, preferably CID 10 as described above, in electrical communication with either of the first or second electrodes of the battery, and at least one venting means 112 on cell casing 104. As described above, battery can 102 is electrically insulated from the first terminal that is in electrical communication with the first electrode of the battery. At least a portion of battery can 102 is at least a component of the second terminal that is in electrical communication with the second electrode of the battery. Lid 106 is welded on cell casing 104 such that the welded lid is detached from cell casing 104 at an internal gauge pressure greater than about 20 kg/cm$^2$. The CID includes a first conductive plate (e.g., first conductive plate 12) and a second conductive plate (e.g., second conductive plate 24) in electrical communication with each other, preferably by a weld. This electrical communication is interrupted at an internal gauge pressure between about 4 kg/cm$^2$ and about 9 kg/cm$^2$, between about 5 kg/cm$^2$ and about 9 kg/cm$^2$ or between about 7 kg/cm$^2$ and about 9 kg/cm$^2$. For example, the first and second conductive plates are welded, e.g., laser welded, to each other such that the weld ruptures at the predetermined gauge pressure. At least one venting means 112 is formed to vent interior gaseous species when an internal gauge pressure in a range of between about 10 kg/cm$^2$ and about 20 kg/cm$^2$ or between about 12 kg/cm$^2$ and about 20 kg/cm$^2$. As described above, it is noted that gauge pressure values or sub-ranges suitable for the activation of CID 10 and those for activation of venting means 112 are selected from among the predetermined gauge pressure ranges such that there is no overlap between the selected pressure values or sub-ranges. Preferably, the values or ranges of gauge pressure for the activation of CID 10 and those for the activation of venting means 112 differ by at least about 2 kg/cm$^2$ pressure difference, more preferably by at least about 4 kg/cm$^2$, even more preferably by at least about 6 kg/cm$^2$, such as by about 7 kg/cm$^2$. Also, it is noted that gauge pressure values or sub-ranges suitable for the rupture of the welded lid 106 from cell casing 104 and those for activation of venting means 112 are selected from among the predetermined gauge pressure ranges such that there is no overlap between the selected pressure values or sub-ranges. Preferably, the values or ranges of gauge pressure for the activation of CID 10 and those for the activation of venting means 112 differ by at least about 2 kg/cm$^2$ pressure difference, more preferably by at least about 4 kg/cm$^2$, even more preferably by at least about 6 kg/cm$^2$.

Preferably, the battery of the invention is rechargeable, such as a rechargeable lithium-ion battery.

Preferably, the battery of the invention, such as a lithium-ion battery, has an internal gauge pressure of less than or equal to about 2 kg/cm$^2$ under a normal working condition. For such a battery of the invention, in one embodiment, the active electrode materials are first activated and then the battery can of the battery is hermetically sealed.

The battery (or cell) of the invention can be cylindrical (e.g., 26650, 18650, or 14500 configuration) or prismatic (stacked or wound, e.g., 183665 or 103450 configuration). Preferably, they are prismatic, and, more preferably, of a prismatic shape that is oblong. Although the present invention can use all types of prismatic cell casings, an oblong cell casing is preferred partly due to the two features described below.

The available internal volume of an oblong shape, such as the 183665 form factor, is larger than the volume of two 18650 cells, when comparing stacks of the same external volume. When assembled into a battery pack, the oblong cell fully utilizes more of the space that is occupied by the battery pack. This enables novel design changes to the internal cell components that can increase key performance features without sacrificing cell capacity relative to that found in the industry today. Due to the larger available volume, one can elect to use thinner electrodes, which have relatively higher cycle life and a higher rate capability. Furthermore, an oblong can has larger flexibility. For instance, an oblong shape can flex more at the waist point compared to a cylindrically shaped can, which allows less flexibility as stack pressure increases upon charging. The increased flexibility decreases mechanical fatigue on the electrodes, which, in turn, causes higher cycle life. Also, clogging of pores of a separator in batteries can be improved by a relatively low stack pressure.

A particularly desired feature, allowing relatively higher safety, is available for the oblong shaped battery compared to the prismatic battery. The oblong shape provides a snug fit to the jelly roll, which minimizes the amount of electrolyte necessary for the battery. The relatively low amount of electrolyte results in less available reactive material during a misuse scenario and hence higher safety. In addition, cost is lower due to a lower amount of electrolyte. In the case of a prismatic can with a stacked electrode structure, whose cross-section is in a rectangular shape, essentially full volume utilization is possible without unnecessary electrolyte, but this type of can design is more difficult and hence more costly from a manufacturing point-of-view.

Figure 9:
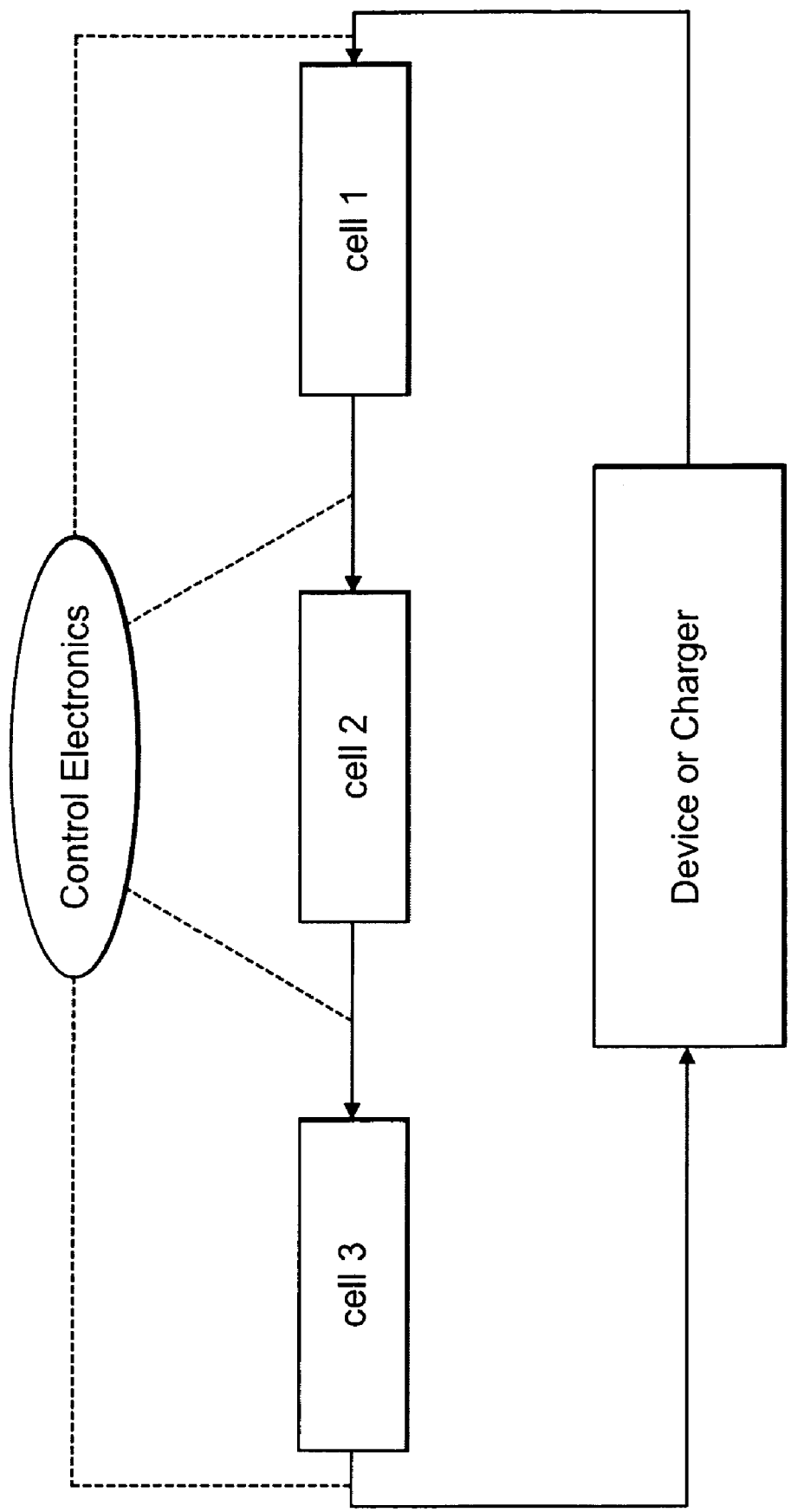
FIG. 9 is a schematic circuitry showing how individual cells in the invention are preferably connected when arranged together in a battery pack of the invention.

Referring to FIG. 9, in some embodiments of the invention, a plurality of lithium-ion batteries of the invention (e.g., 2 to 5 cells) can be connected in a battery pack, wherein each of the batteries (cells) is connected with each other in series, parallel, or in series and parallel. In some battery packs of the invention, there are no parallel connections between the batteries.

Preferably, at least one cell has a prismatic shaped cell casing, and more preferably, an oblong shaped cell casing, as shown in FIG. 8A. Preferably, the capacity of the cells in the battery pack is typically equal to or greater than about 3.0 Ah, more preferably equal to or greater than about 4.0 Ah. The internal impedance of the cells is preferably less than about 50 milli-ohms, and more preferably less than 30 milli-ohms.

The lithium-ion batteries and battery packs of the invention can be used for portable power devices, such as portable computers, power tools, toys, portable phones, camcorders, PDAs and the like. In portable electronic devices using lithium-ion batteries, their charges are, in general, designed for a 4.20 V charging voltage. Thus, the lithium-ion batteries and battery packs of the invention are particularly useful for these portable electronic devices.

The present invention also includes methods of producing a battery, such as a lithium-ion battery, as described above. The methods include forming a cell casing as described above, and disposing a first electrode and a second electrode within the cell casing. A current interrupt device, as described above (e.g., current interrupt device 28), is formed and electrically connected with the cell casing.

Positive and negative electrodes and electrolytes for the lithium-ion batteries of the invention can be formed by suitable methods known in the art.

Examples of suitable negative-active materials for the negative electrodes include any material allowing lithium to be doped or undoped in or from the material. Examples of such materials include carbonaceous materials, for example, non-graphitic carbon, artificial carbon, artificial graphite, natural graphite, pyrolytic carbons, cokes such as pitch coke, needle coke, petroleum coke, graphite, vitreous carbons, or a heat-treated organic polymer compounds obtained by carbonizing phenol resins, furan resins, or similar, carbon fibers, and activated carbon. Further, metallic lithium, lithium alloys, and an alloy or compound thereof are usable as the negative active materials. In particular, the metal element or semiconductor element allowed to form an alloy or compound with lithium may be a group IV metal element or semiconductor element, such as, but not limited to, silicon or tin. In particular, amorphous tin that is doped with a transition metal, such as cobalt or iron/nickel, is a metal that is suitable as an anode material in these types of batteries. Oxides allowing lithium to be doped or undoped in or out from the oxide at a relatively basic potential, such as iron oxide, ruthenium oxide, molybdenum oxide, tungsten oxide, titanium oxide, and tin oxide, and nitrides, similarly, are usable as the negative-active materials.

Suitable positive-active materials for the positive electrodes include any material known in the art, for example, lithium nickelate (e.g., $Li_{1+x}NiM'O_2$ where x is equal to or greater than zero and equal to or less than 0.2), lithium cobaltate (e.g., $Li_{1+x}CoO_2$ where x is equal to or greater than zero and equal to or less than 0.2), olivine-type compounds (e.g., $Li_{1+x}FePO_4$ where x is equal to or greater than zero and equal to or less than 0.2), manganate spinel (e.g., $Li_{1+x9}Mn_{2-y9}O_4$ (x9 and y9 are each independently equal to or greater than zero and equal to or less than 0.3, e.g., $0 \leq x9$, $y9 \leq 0.2$ or $0.05 \leq x9$, $y9 \leq 0.15$) or $Li_{1+x1}(Mn_{1-y1}A'_{y2})_{2-x2}O_{z1}$ (x1 and x2 are each independently equal to or greater than 0.01 and equal to or less than 0.3; y1 and y2 are each independently equal to or greater than 0.0 and equal to or less than 0.3; z1 is equal to or greater than 3.9 and equal to or less than 4.2), and mixtures thereof. Various examples of suitable positive-active materials can be found in international application No. PCT/US2005/047383, filed on Dec. 23, 2005, U.S. patent application Ser. No. 11/485,068, file on Jul. 12, 2006, and International Application, filed on Jun. 22, 2007, entitled "Lithium-Ion Secondary Battery", the entire teachings of all of which are incorporated herein by reference.

In one specific embodiment, the positive-active materials for the positive electrodes of the invention include a lithium cobaltate, such as $Li_{(1+x8)}CoO_{z8}$. More specifically, a mixture of about 60-90 wt % (e.g. about 80 wt %) of a lithium cobaltate, such as $Li_{(1+x8)}CoO_{z8}$, and about 40-10 wt % (e.g., about 20 wt %) of a manganate spinel, such as $Li_{(1+x1)}Mn_2O_{z1}$, preferably $Li_{(1+x1)}Mn_2O_4$, is employed for the invention. The value x1 is equal to or greater than zero and equal to or less than 0.3 (e.g., $0.05 \leq x1 \leq 0.2$ or $0.05 \leq x1 \leq 0.15$). The value z1 is equal to or greater than 3.9 and equal to or greater than 4.2. The value x8 is equal to or greater than zero and equal to or less than 0.2. The value z8 is equal to or greater than 1.9 and equal to or greater than 2.1.

In another specific embodiment, the positive-active materials for the invention include a mixture that includes a lithium cobaltate, such as $Li_{(1+x8)}CoO_{z8}$, and a manganate spinel represented by an empirical formula of $Li_{(1+x1)}(Mn_{1-y1}A'_{y2})_{2-x2}O_{z1}$. The values x1 and x2 are each independently equal to or greater than 0.01 and equal to or less than 0.3. The values y1 and y2 are each independently equal to or greater than 0.0 and equal to or less than 0.3. The value z1 is equal to or greater than 3.9 and equal to or less than 4.2. A' is at least one member of the group consisting of magnesium, aluminum, cobalt, nickel and chromium. More specifically, the lithium cobaltate and the manganate spinel are in a weight ratio of lithium cobaltate:manganate spinel between about 0.95:0.05 and about 0.9:0.1 to about 0.6:0.4.

In yet another specific embodiment, the positive-active materials for the invention include a mixture that includes 100% of a lithium cobaltate, such as $Li_{(1+x8)}CoO_{z8}$.

In yet another specific embodiment, the positive-active materials for the invention include at least one lithium oxide selected from the group consisting of: a) a lithium cobaltate; b) a lithium nickelate; c) a manganate spinel represented by an empirical formula of $Li_{(1+x1)}(Mn_{1-y1}A'_{y2})_{2-x2}O_{z1}$; d) a manganate spinel represented by an empirical formula of $Li_{(1+x1)}Mn_2O_{z1}$ or $Li_{1+x9}Mn_{2-y9}O_4$; and e) an olivine compound represented by an empirical formula of $Li_{(1-x10)}A''_{x10}MPO_4$. The values of x1, z1, x9 and y9 are as described above. The value, x2, is equal to or greater than 0.01 and equal to or less than 0.3. The values of y1 and y2 are each independently equal to or greater than 0.0 and equal to or less than 0.3. A' is at least one member of the group consisting of magnesium, aluminum, cobalt, nickel and chromium. The value, x10, is equal to or greater than 0.05 and equal to or less than 0.2, or the value, x10, is equal to or greater than 0.0 and equal to or less than 0.1. M is at least one member of the group consisting of iron, manganese, cobalt and magnesium. A'' is at least one member of the group consisting of sodium, magnesium, calcium, potassium, nickel and niobium.

A lithium nickelate that can be used in the invention includes at least one modifier of either the Li atom or Ni atom, or both. As used herein, a "modifier" means a substituent atom that occupies a site of the Li atom or Ni atom, or both, in a crystal structure of $LiNiO_2$. In one embodiment, the lithium nickelate includes only a modifier of, or substituent for, Li atoms ("Li modifier"). In another embodiment, the lithium nickelate includes only a modifier of, or substituent for, Ni atoms ("Ni modifier"). In yet another embodiment, the lithium nickelate includes both the Li and Ni modifiers. Examples of Li modifiers include barium (Ba), magnesium (Mg), calcium (Ca) and strontium (Sr). Examples of Ni modifiers include those modifiers for Li and, in addition, aluminum (Al), manganese (Mn) and boron (B). Other examples of Ni modifiers include cobalt (Co) and titanium (Ti). Preferably, the lithium nickelate is coated with $LiCoO_2$. The coating can be, for example, a gradient coating or a spot-wise coating.

One particular type of a lithium nickelate that can be used in the invention is represented by an empirical formula of $Li_{x3}Ni_{1-z3}M'_{z3}O_2$ where $0.05<x3<1.2$ and $0<z3<0.5$, and M' is one or more elements selected from a group consisting of Co, Mn, Al, B, Ti, Mg, Ca and Sr. Preferably, M' is one or more elements selected from a group consisting of Mn, Al, B, Ti, Mg, Ca and Sr.

Another particular type of a lithium nickelate that can be used in the invention is represented by an empirical formula of $Li_{x4}A^*_{x5}Ni_{(1-y4-z4)}Co_{y4}Q_{z4}O_a$ where x4 is equal to or greater than about 0.1 and equal to or less than about 1.3; x5 is equal to or greater than 0.0 and equal to or less than about 0.2; y4 is equal to or greater than 0.0 and equal to or less than about 0.2; z4 is equal to or greater than 0.0 and equal to or less than about 0.2; a is greater than about 1.5 and less than about 2.1; A* is at least one member of the group consisting of barium (Ba), magnesium (Mg) and calcium (Ca); and Q is at least one member of the group consisting of aluminum (Al), manganese (Mn) and boron (B). Preferably, y4 is greater than zero. In one preferred embodiment, x5 is equal to zero, and z4 is greater than 0.0 and equal to or less than about 0.2. In another embodiment, z4 is equal to zero, and x5 is greater than 0.0 and equal to or less than about 0.2. In yet another embodiment, x5 and z4 are each independently greater than 0.0 and equal to or less than about 0.2. In yet another embodiment, x5, y4 and z4 are each independently greater than 0.0 and equal to or less than about 0.2. Various examples of lithium nickelates where x5, y4 and z4 are each independently greater than 0.0 and equal to or less than about 0.2, can be found in U.S. Pat. Nos. 6,855,461 and 6,921,609 (the entire teachings of which are incorporated herein by reference).

A specific example of the lithium nickelate is $LiNi_{0.08}CO_{0.15}Al_{0.05}O_2$. A preferred specific example is $LiCoO_2$-coated $LiNi_{0.8}CO_{0.15}Al_{0.05}O_2$. In a spot-wise coated cathode, $LiCoO_2$ doe not fully coat the nickelate core particle. The composition of $LiNi_{0.8}CO_{0.15}Al_{0.05}O_2$ coated with $LiCoO_2$ can naturally deviate slightly in composition from the 0.8:0.15:0.05 weight ratio between Ni:Co:Al. The deviation can range about 10-15% for the Ni, 5-10% for Co and 2-4% for Al. Another specific example of the lithium nickelate is $Li_{0.97}Mg_{0.03}Ni_{0.9}Co_{0.1}O_2$. A preferred specific example is $LiCoO_2$-coated $Li_{0.97}Mg_{0.03}Ni_{0.9}Co_{0.1}O_2$. The composition of $Li_{0.97}Mg_{0.03}Ni_{0.9}Co_{0.1}O_2$ coated with $LiCoO_2$ can deviate slightly in composition from the 0.03:0.9:0.1 weight ratio between Mg:Ni:Co. The deviation can range about 2-4% for Mg, 10-15% for Ni and 5-10% for Co. Another preferred nickelate that can be used in the present invention is $Li(Ni_{1/3}Co_{1/3}Mn_{1/3})O_2$, also called "333-type nickelate." This 333-type nickelate optionally can be coated with $LiCoO_2$, as described above.

Suitable examples of lithium cobaltates that can be used in the invention include $Li_{1+x8}CoO_2$ that is modified by at least one of Li or Co atoms. Examples of the Li modifiers are as described above for Li of lithium nickelates. Examples of the Co modifiers include the modifiers for Li and aluminum (Al), manganese (Mn) and boron (B). Other examples include nickel (Ni) and titanium (Ti) and, in particular, lithium cobaltates represented by an empirical formula of $Li_{x6}M'_{(1-y6)}Co_{(1-z6)}M''_{z6}O_2$, where x6 is greater than 0.05 and less than 1.2; y6 is equal to or greater than 0 and less than 0.1, z6 is equal to or greater than 0 and less than 0.5; M' is at least one member of magnesium (Mg) and sodium (Na) and M" is at least one member of the group consisting of manganese (Mn), aluminum (Al), boron (B), titanium (Ti), magnesium (Mg), calcium (Ca) and strontium (Sr), can be used in the invention. Another example of a lithium cobaltate that can be used in the invention is unmodified $Li_{1+x8}CoO_2$, such as $LiCoO_2$. In one specific embodiment, the lithium cobaltate (e.g., $LiCoO_2$) doped with Mg and/or coated with a refractive oxide or phosphate, such as $ZrO_2$ or $Al(PO_4)$.

It is particularly preferred that lithium oxide compounds employed have a spherical-like morphology, since it is believed that this improves packing and other production-related characteristics.

Preferably, a crystal structure of each of the lithium cobaltate and lithium nickelate is independently a R-3m type space group (rhombohedral, including distorted rhombohedral). Alternatively, a crystal structure of the lithium nickelate can be in a monoclinic space group (e.g., P2/m or C2/m). In a R-3m type space group, the lithium ion occupies the "3a" site (x=0, y=0 and z=0) and the transition metal ion (i.e., Ni in a lithium nickelate and Co in a lithium cobaltate) occupies the "3b" site (x=0, y=0, z=0.5). Oxygen is located in the "6a" site (x=0, y=0, z=z0, where z0 varies depending upon the nature of the metal ions, including modifier(s) thereof).

Examples of olivine compounds that are suitable for use in the invention are generally represented by a general formula $Li_{1-x2}A''_{x2}MPO_4$, where x2 is equal to or greater than 0.05, or x2 is equal to or greater than 0.0 and equal to or greater than 0.1; M is one or more elements selected from a group consisting of Fe, Mn, Co, or Mg; and A" is selected from a group consisting of Na, Mg, Ca, K, Ni, Nb. Preferably, M is Fe or Mn. More preferably, $LiFePO_4$ or $LiMnPO_4$, or both are used in the invention. In a preferred embodiment, the olivine compounds are coated with a material having relatively high electrical conductivity, such as carbon. In a more preferred embodiment, carbon-coated $LiFePO_4$ or carbon-coated $LiMnPO_4$ is employed in the invention. Various examples of olivine compounds where M is Fe or Mn can be found in U.S. Pat. No. 5,910,382 (the entire teachings of which are incorporated herein by reference).

The olivine compounds typically have a small change in crystal structure upon charging/discharging, which generally makes the olivine compounds superior in terms of cycle characteristics. Also, safety is generally high, even when a battery is exposed to a high temperature environment. Another advantage of olivine compounds (e.g., $LiFePO_4$ and $LiMnPO_4$) is their relatively low cost.

Manganate spinel compounds have a manganese base, such as $LiMn_2O_4$. While the manganate spinel compounds typically have relatively low specific capacity (e.g., in a range of about 110 to 115 mAh/g), they have relatively high power delivery when formulated into electrodes and typically are safe in terms of chemical reactivity at higher temperatures. Another advantage of the manganate spinel compounds is their relatively low cost.

One type of manganate spinel compounds that can be used in the invention is represented by an empirical formula of $Li_{(1+x1)}(Mn_{1-y1}A'_{y2})_{2-x2}O_{z1}$, where A' is one or more of Mg, Al, Co, Ni and Cr; x1 and x2 are each independently equal to or greater than 0.01 and equal to or less than 0.3; y1 and y2 are each independently equal to or greater than 0.0 and equal to or less than 0.3; z1 is equal to or greater than 3.9 and equal to or less than 4.1. Preferably, A' includes a $M^{3+}$ ion, such as $Al^{3+}$, $Co^{3+}$, $Ni^{3+}$ and $Cr^{3+}$, more preferably $A^{3+}$. The manganate spinel compounds of $Li_{(1+x1)}(Mn_{1-y}A'_{y2})_{2-x2}O_{z1}$ can have enhanced cyclability and power compared to those of $LiMn_2O_4$. Another type of manganate spinel compounds that can be used in the invention is represented by an empirical formula of $Li_{(1+x1)}Mn_2O_{z1}$, where x1 and z1 are each independently the same as described above. Alternatively, the manganate spinel for the invention includes a compound represented by an empirical formula of $Li_{1+x9}Mn_{2-y9}O_{z9}$ where x9 and y9 are each independently equal to or greater than 0.0 and equal to or less than 0.3 (e.g., $0.05 \leq x9, y9 \leq 0.15$); and z9 is equal to or greater than 3.9 and equal to or less than 4.2. Specific examples of the manganate spinel that can be used in the invention include $LiMn_{1.9}Al_{0.1}O_4$, $Li_{1+x}Mn_2O_4$, $Li_{1+x7}Mn_{2-y7}O_4$, and their variations with Al and Mg modifiers. Various other examples of manganate spinel compounds of the type $Li_{(1+x1)}(Mn_{1-y}A'_{y2})_{2-x2}O_{z1}$ can be found in U.S. Pat. Nos. 4,366,215; 5,196,270; and 5,316,877 (the entire teachings of which are incorporated herein by reference).

It is noted that the suitable cathode materials described herein are characterized by empirical formulas that exist upon manufacture of lithium-ion batteries in which they are incorporated. It is understood that their specific compositions thereafter are subject to variation pursuant to their electrochemical reactions that occur during use (e.g., charging and discharging).

Examples of suitable non-aqueous electrolytes include a non-aqueous electrolytic solution prepared by dissolving an electrolyte salt in a non-aqueous solvent, a solid electrolyte (inorganic electrolyte or polymer electrolyte containing an electrolyte salt), and a solid or gel-like electrolyte prepared by mixing or dissolving an electrolyte in a polymer compound or the like.

The non-aqueous electrolytic solution is typically prepared by dissolving a salt in an organic solvent. The organic solvent can include any suitable type that has been generally used for batteries of this type. Examples of such organic solvents include propylene carbonate (PC), ethylene carbonate (EC), diethyl carbonate (DEC), dimethyl carbonate (DMC), 1,2-dimethoxyethane, 1,2-diethoxyethane, γ-butyrolactone, tetrahydrofuran, 2-methyl tetrahydrofuran, 1,3-dioxolane, 4-methyl-1,3-dioxolane, diethyl ether, sulfolane, methylsulfolane, acetonitrile, propionitrile, anisole, acetate, butyrate, propionate and the like. It is preferred to use cyclic carbonates such as propylene carbonate, or chain carbonates such as dimethyl carbonate and diethyl carbonate. These organic solvents can be used singly or in a combination of two types or more.

Additives or stabilizers may also be present in the electrolyte, such as VC (vinyl carbonate), VEC (vinyl ethylene carbonate), EA (ethylene acetate), TPP (triphenylphosphate), phosphazenes, biphenyl (BP), cyclohexylbenzene (CHB), 2,2-diphenylpropane (DP), lithium bis(oxalato)borate (LiBoB), ethylene sulfate (ES) and propylene sulfate. These additives are used as anode and cathode stabilizers, flame retardants or gas releasing agents, which may make a battery have higher performance in terms of formation, cycle efficiency, safety and life.

The solid electrolyte can include an inorganic electrolyte, a polymer electrolyte and the like insofar as the material has lithium-ion conductivity. The inorganic electrolyte can include, for example, lithium nitride, lithium iodide and the like. The polymer electrolyte is composed of an electrolyte salt and a polymer compound in which the electrolyte salt is dissolved. Examples of the polymer compounds used for the polymer electrolyte include ether-based polymers such as polyethylene oxide and cross-linked polyethylene oxide, polymethacrylate ester-based polymers, acrylate-based polymers and the like. These polymers may be used singly, or in the form of a mixture or a copolymer of two kinds or more.

A matrix of the gel electrolyte may be any polymer insofar as the polymer is gelated by absorbing the above-described non-aqueous electrolytic solution. Examples of the polymers used for the gel electrolyte include fluorocarbon polymers such as polyvinylidene fluoride (PVDF), polyvinylidene-co-hexafluoropropylene (PVDF-HFP) and the like.

Examples of the polymers used for the gel electrolyte also include polyacrylonitrile and a copolymer of polyacrylonitrile. Examples of monomers (vinyl based monomers) used for copolymerization include vinyl acetate, methyl methacrylate, butyl methacylate, methyl acrylate, butyl acrylate, itaconic acid, hydrogenated methyl acrylate, hydrogenated ethyl acrylate, acrlyamide, vinyl chloride, vinylidene fluoride, and vinylidene chloride. Examples of the polymers used for the gel electrolyte further include acrylonitrile-butadiene copolymer rubber, acrylonitrile-butadiene-1-styrene copolymer resin, acrylonitrile-chlorinated polyethylene-propylene-diene-styrene copolymer resin, acrylonitrile-vinyl chloride copolymer resin, acrylonitrile-methacylate resin, and acrlylonitrile-acrylate copolymer resin.

Examples of the polymers used for the gel electrolyte include ether based polymers such as polyethylene oxide, copolymer of polyethylene oxide, and cross-linked polyethylene oxide. Examples of monomers used for copolymerization include polypropylene oxide, methyl methacrylate, butyl methacylate, methyl acrylate, butyl acrylate.

In particular, from the viewpoint of oxidation-reduction stability, a fluorocarbon polymer is preferably used for the matrix of the gel electrolyte.

The electrolyte salt used in the electrolyte may be any electrolyte salt suitable for batteries of this type. Examples of the electrolyte salts include $LiClO_4$, $LiAsF_6$, $LiPF_6$, $LiBF_4$, $LiB(C_6HS)_4$, $LiB(C_2O_4)_2$, $CH_3SO_3L_1$, $CF_3SO_3Li$, $LiCl$, LiBr and the like. Generally, a separator separates the positive electrode from the negative electrode of the batteries. The separator can include any film-like material having been generally used for forming separators of non-aqueous electrolyte secondary batteries of this type, for example, a microporous polymer film made from polypropylene, polyethylene, or a layered combination of the two. In addition, if a solid electrolyte or gel electrolyte is used as the electrolyte of the battery, the separator does not necessarily need to be provided. A microporous separator made of glass fiber or cellulose material can in certain cases also be used. Separator thickness is typically between 9 and 25 μm.

In some specific embodiments, a positive electrode can be produced by mixing the cathode powders at a specific ratio. 90 wt % of this blend is then mixed together with 5 wt % of acetylene black as a conductive agent, and 5 wt % of PVDF as a binder. The mix is dispersed in N-methyl-2-pyrrolidone (NMP) as a solvent, in order to prepare slurry. This slurry is then applied to both surfaces of an aluminum current collector foil, having a typical thickness of about 20 um, and dried at about 100-150° C. The dried electrode is then calendared by a roll press, to obtain a compressed positive electrode. When $LiCoO_2$ is solely used as the positive electrode a mixture using 94 wt % $LiCoO_2$, 3% acetylene black, and 3% PVDF is typically used. A negative electrode can be prepared by mixing 93 Wt % of graphite as a negative active material, 3 wt % acetylene black, and 4 wt % of PVDF as a binder. The negative mix was also dispersed in N-methyl-2-pyrrolidone as a solvent, in order to prepare the slurry. The negative mix slurry was uniformly applied on both surfaces of a strip-like copper negative current collector foil, having a typical thickness of about 10 um. The dried electrode is then calendared by a roll press to obtain a dense negative electrode.

The negative and positive electrodes and a separator formed of a polyethylene film with micro pores, of thickness 25 um, are generally laminated and spirally wound to produce a spiral type electrode element.

In some embodiments, one or more positive lead strips, made of, e.g., aluminum, are attached to the positive current electrode, and then electrically connected to the positive terminal of the batteries of the invention. A negative lead, made of, e.g., nickel metal, connects the negative electrode, and then attached to a feed-through device. An electrolyte of for instance EC:DMC:DEC with 1 M LiPF$_6$, is vacuum filled in the cell casing of a lithium-ion battery of the invention, where the cell casing has the spirally wound "jelly roll."

EXEMPLIFICATION

Example 1

Preparation of the CIDs of the Invention

In this example, a process for manufacturing a CID as shown in FIG. 1, which includes a first conductive plate, a second conductive plate, a retainer between the two conductive plates, and an end plate.

1A. Preparation of First Conductive Plate 12

The first conductive plate (hereinafter "pressure disk") was formed by stamping a flat sheet of Aluminum 3003 (HO) into a shape resembling a hat with angled edges, as shown in FIGS. 2A-2C. A flat aluminum sheet having a thickness of about 0.005 inches (about 0.127 mm) ("d" in FIG. 2C) was used. The flat aluminum sheet was first depressed using a conical punch with a flat top to thereby form a conical frustum, a base having a diameter of about 0.315 inches (about 8 mm) ("a" in FIG. 2C), and a flat top at a height of about 0.03 inches (about 0.762 mm) ("c" in FIG. 2C) from the base. The diameter of the flat top ("b" in FIG. 2C) was about 0.215 inches (about 5.46 mm). The angle of the frustum relative to a plane parallel to the base was about 21 degrees. The depressed aluminum sheet was then trimmed for the base to have a diameter of about 0.500 inches (about 12.7 mm).

1B. Preparation of Second Conductive Plate 24

The second conductive plate (hereinafter "weld disk") was manufactured from aluminum in a progressive die. An aluminum stock (3003 H14) which was about 0.020 inches (about 0.508 mm) thick was fed into the progressive die where multiple stamping and coining operations produced a part with an outer diameter of about 0.401 inches (about 10.2 mm), a concentric depression having a diameter of about 0.100 inches (about 2.54 mm, "a" in FIG. 3C) and a thickness of about 0.003 inches (about 0.0762 mm) ("c" in FIG. 3C). Two symmetric trough holes of about 0.040 inches (about 1.02 mm) in diameter were made to the plate for pressure communication on both sides of the depression. The holes were located at a distance of about 0.140 inches (about 3.56 mm) from the center of the plate.

1 C. Preparation of Retainer Ring 40

A retainer ring as shown in FIG. 1, FIG. 8A, and FIG. 8D was manufactured of polypropylene material by means of injection molding. The purpose of the retainer ring was to hold the weld disk at a fixed distance to the pressure disk before, during, and after the reversal of the pressure disk. The reversal of the pressure disk occurred when the CID was activated. The retainer ring was also employed to ensure that the weld disk was electrically isolated from the pressure risk after its reversal. The retainer ring included an over-mold feature which secured the weld disk in place after it had been snapped into the retainer ring.

1D. Preparation of the End Plate 34

An end plate as shown in FIG. 4 can provide a space necessary for accommodating the pressure disk and for the reversal of the frustum part of the pressure disk. In this example, the lid of a battery can was employed as the end plate. The end plate was manufactured from stamped Aluminum 3003 series (H14).

For the space necessary for accommodating the pressure disk, a first cylindrical embossment (or recess 36 in FIG. 4) was created by milling or alternatively stamping operation onto the lid. The diameter of the embossment ("a" in FIG. 4) was about 0.505 inches (about 12.8 mm), which was slightly larger than the outer diameter of the pressure disk (about 0.500 inches (about 12.7 mm)). The depth of the first embossment ("b" in FIG. 4) was about 0.0045 inches (about 0.114 mm), which was slightly less then the thickness of the pressure disk (about 0.005 inches (about 0.127 mm)).

For the space necessary for accommodating the frustum portion of the pressure disk upon its reversal, a second concentric embossment (recess 38 in FIG. 4) was similarly fabricated by milling or alternatively stamping. This second embossment had a diameter of about 0.325 inches (about 8.25 mm), which was slightly larger then the base diameter of the pressure disk frustum (about 0.315 inches (about 8.0 mm)). The second embossment also had a depth of about 0.029 inches (about 0.737 mm) ("d" in FIG. 4), as measured from the first embossment, which was slightly larger than the net height of the pressure disk (about 0.025 inches (about 0.635 mm), "c" in FIG. 3C), as measured from datum line at the base of the frustum.

To accommodate a weld pin, a through hole, which was concentric with the two embossments, was made by drilling or punching. The hole had a diameter of about 0.100 inches (about 2.54 mm), which was large enough to accommodate the weld pin to be used for support and cooling of the pressure disk during a spot welding operation described below.

1E. Pre-Cleaning of the Weld Disk, End Plate and Retainer Ring

Prior to assembly, the weld disk (24), end plate (34), and retainer ring (40) were degreased and cleaned with isopropanol (e.g., 90% isopropanol) in an ultrasonic cleaner. The cleaning was typically done for about 10 minutes, and dried in low humidity environment or oven at about 70 degrees Celsius.

1F. Assembly

The components of the CID were assembled as shown in FIG. 1. The pressure disk (12) was placed in the first embossment (recess 36) of the end plate (34), with the conical frustum facing away from the end plate. A vacuum suction was used to pull the pressure disk tightly onto the end plate in order to provide good contact between the two parts. The two parts were joined hermetically by means of penetration welding at the middle circumferential region of base 20 of first conductive plate 12 (e.g., position "a" shown in FIG. 1).

The assembled pressure disk/end plate was placed in a spot weld fixture with a solid Copper (Cu) weld pin that penetrated the end plate through a hole. The weld pin was used to support and cool the pressure disk during the spot welding operation later. The weld disk (24) was placed into the retainer ring. The assembled weld disk/retainer ring was mounted in the spot weld fixture to hold the weld disk/retainer ring assembly concentrically in place on top of the pressure disk. The fixture provided adequate force to push the weld disk firmly onto the pressure disk, to the point of noticeable deformation of the pressure disk and weld disk by the weld pin. The weld disk was attached to the pressure disk with two spot laser welding in the area deformed and supported by the weld pin. During the welding operation, the pressure disk was cooled via the weld pin.

Example 2

Preparation of the Battery of the Invention

Lithium-ion batteries were prepared using either 100% of $Li_{1+x}CoO_2$ (x is about 0-0.2), or a mixture that includes about 80 wt % of $Li_{1+x}CoO_2$ (x is about 0-0.2) and about 20 wt % of $Li_{1+x9}Mn_{(2-y9)}O_4$ (each of x9 and y9 is independently about 0.05-0.15) as their active cathode materials. The cell thickness, cell width and cell height of the batteries were about 18 mm, about 37 mm and about 65-66 mm, respectively. Anodes of the batteries were of carbon. About 5.5 wt % of biphenyl (BP) was included in the electrolytes of the batteries. Al tabs and Ni tabs were employed as the cathode and anode tabs of the batteries, respectively. The Al tabs of the cathode were welded onto the second conductive plate of the CID described above in Example 1. The Ni tabs of the anode of the battery were welded onto the feed-through device of the battery (see FIG. 8A and FIG. 8D).

Example 3

CID Activation Tests

Figure 10:
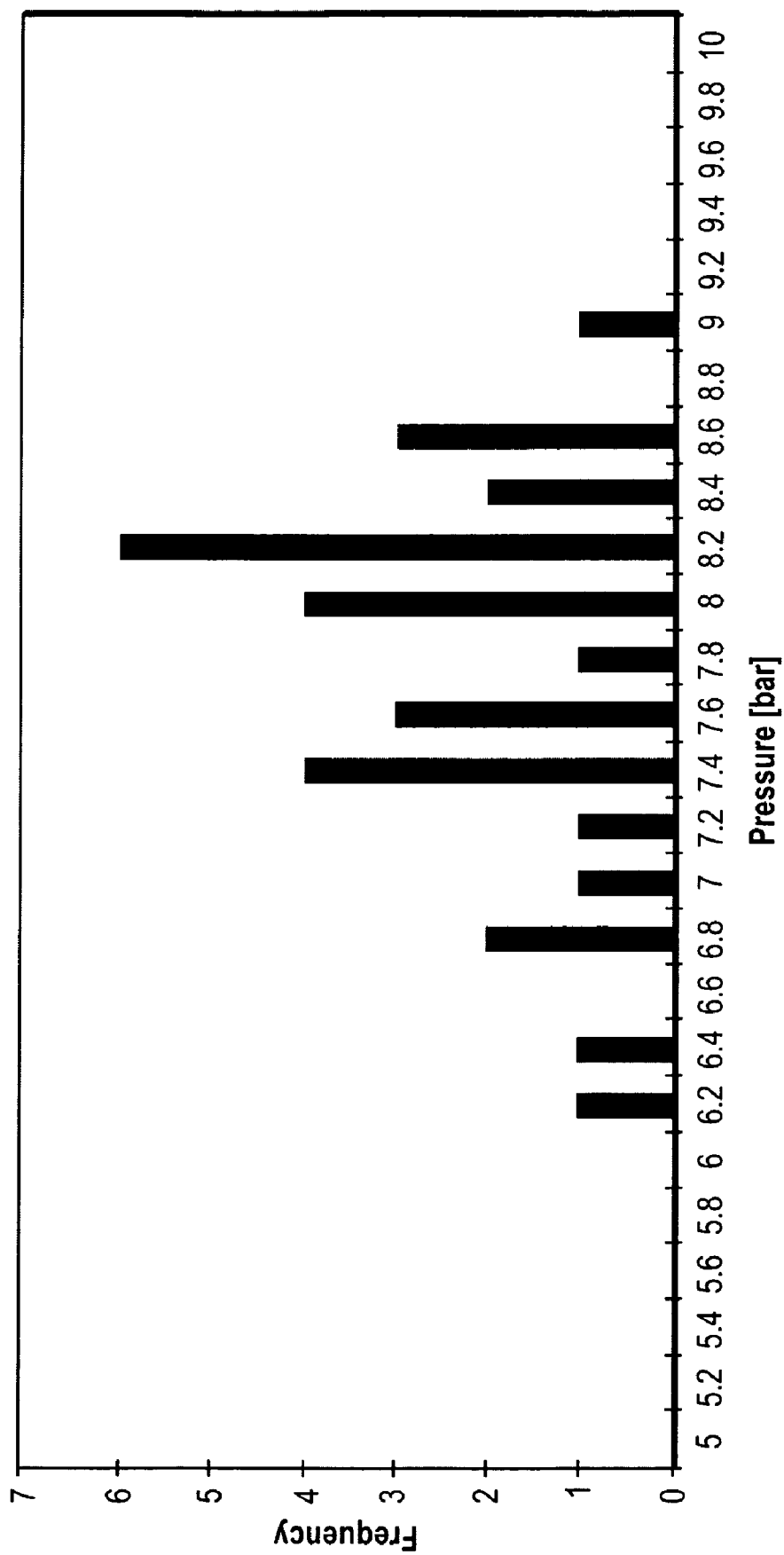
FIG. 10 is a graph showing CID trip pressures of the CIDs of the invention.

The CIDs prepared as described in Example 1, not installed in battery cells, were tested in this example. For these tests, a pressure test fixture was designed so that the CID side of the end plate (34) of the CIDs could be pressurized with compressed air or nitrogen to test the CID Release Pressure (CRP). The test pressure was started at about 5 bar (gauge), and increased in 0.5 bar increments. At each pressure setting, the end plate was kept under the test pressure for 10 seconds before the pressure increase. The pressure increase was done gradually between each setting so that the CRP could be observed with a resolution of a 0.1-0.2 bar. The test results are summarized in FIG. 10. As shown in FIG. 10, the average gauge pressure of the CID trip was about 7.7 bar.

Example 4

CID Activation Tests in Lithium-Ion Batteries

Figure 11:
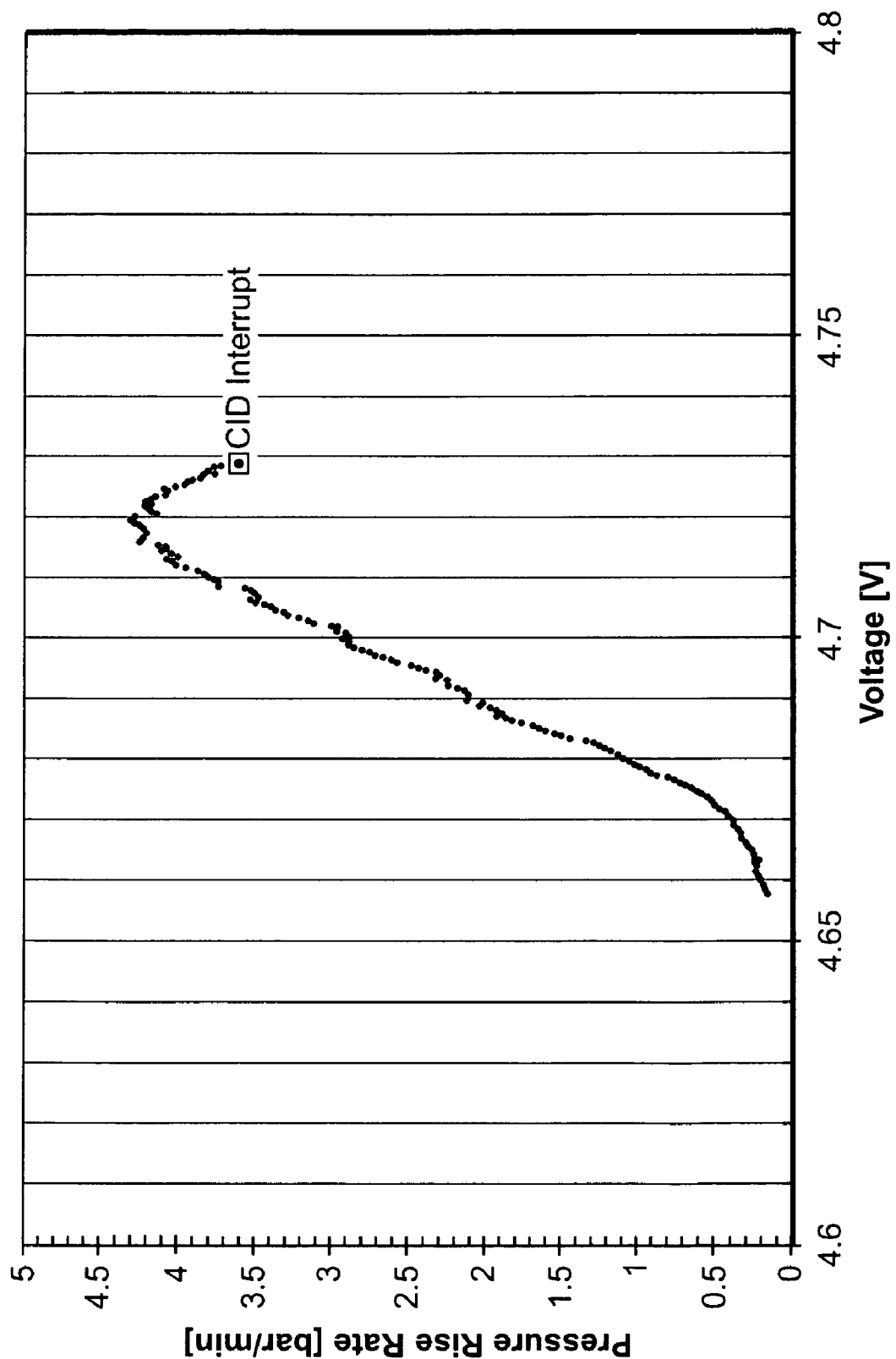
FIG. 11 is a graph showing pressure rise rates with respect to overcharging voltages of the batteries of the invention, when the batteries were overcharged at a 2 C rate per minute.

4A. Lithium-Ion Batteries Including a Mixture of $Li_{1+x}CoO_2$ and $Li_{1+x9}Mn_{(2-y9)}O_4$ For the tests of the example, the lithium-ion batteries that employed a mixture including about 80 wt % of $Li_{1+x}CoO_2$ and about 20 wt % of $Li_{1+x9}Mn_{(2-y9)}O_4$ as their active cathode materials, as described in Example 2, were overcharged at 2 C charge rate. Generally, "1 C" represents a charge rate that would fully recharge the cell, from 1% to 100% state of charge, in one hour. Thus, with the "2 C" rate, the cell would be fully recharged in 30 minutes. The CIDs of the tested batteries were activated between about 5 and 7.5 minutes in average after the full charge of about 4.2V FIG. 11 shows pressure rise rates with respect to the overcharging voltages. In the tested batteries, the internal pressure was increased at a rate of about 5 bar per minute at about 4.68 V of overcharge.

Figure 12:
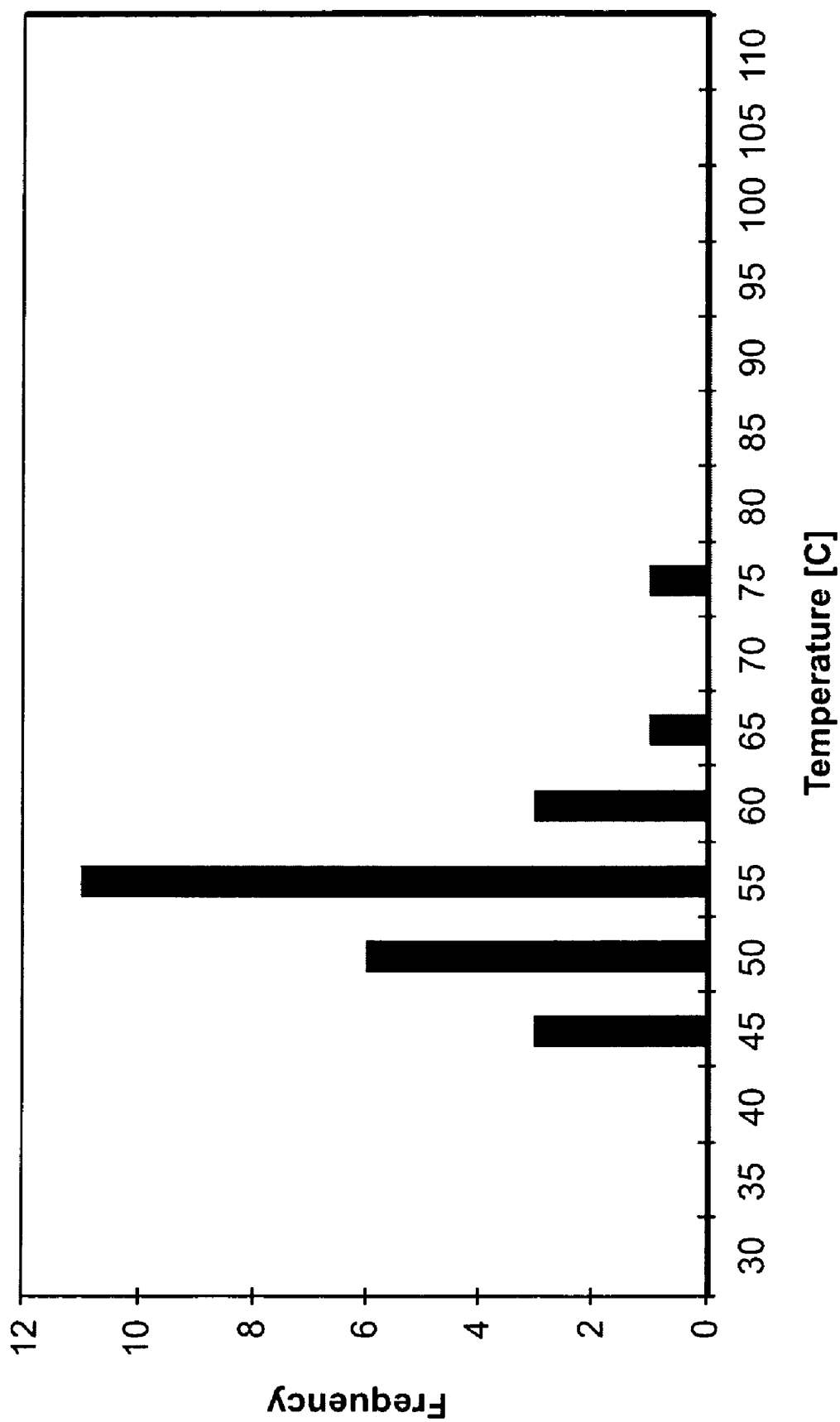
FIG. 12 is a graph showing cell skin temperatures of the batteries of the invention measured when their CIDs were activated.
Figure 13:
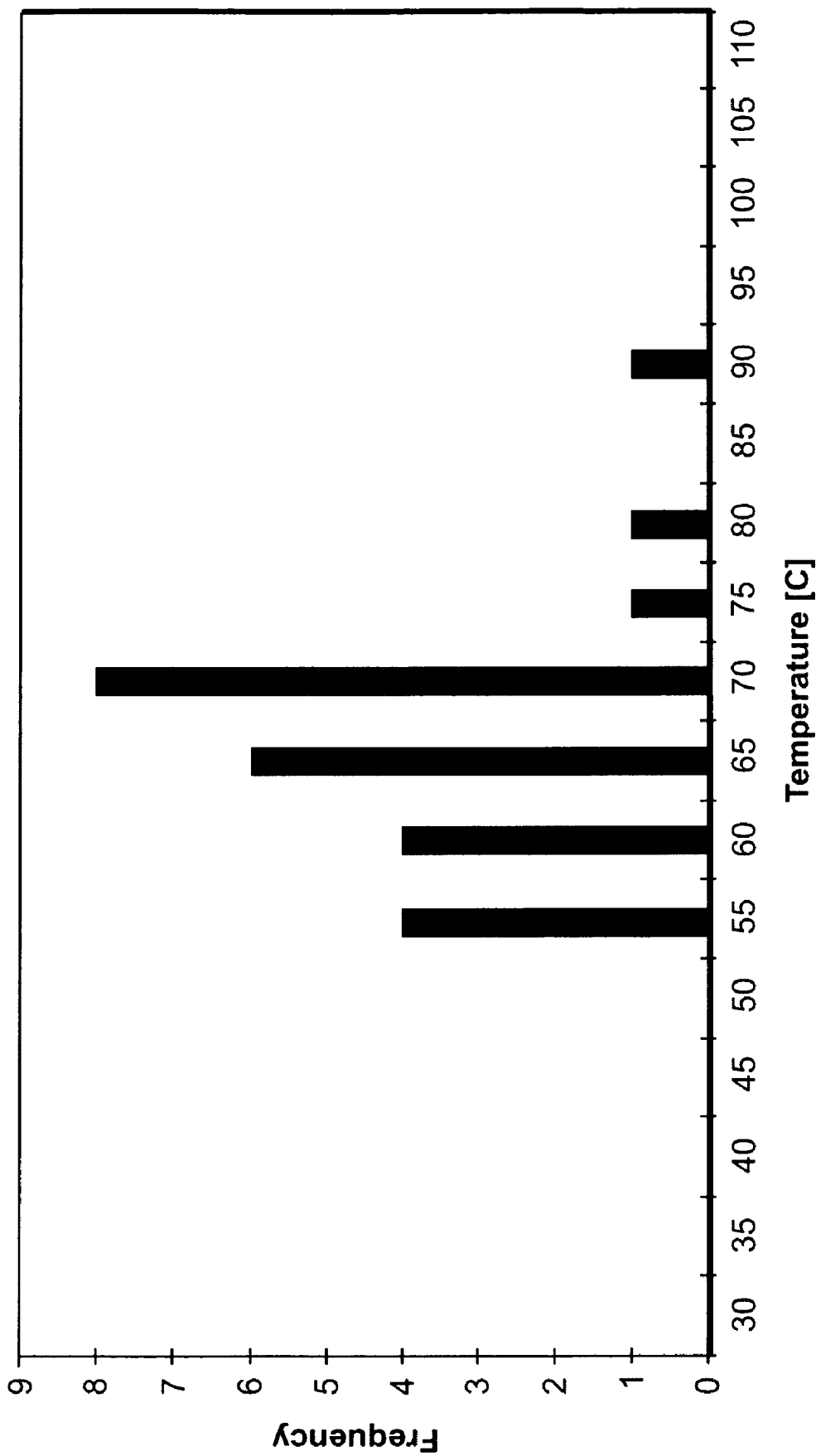
FIG. 13 is a graph showing the maximum cell skin temperatures of batteries of the invention that were overcharged at a 2 C rate per minute.

FIG. 12 shows the cell skin temperatures measured when the CIDs of the tested batteries were activated. As shown in FIG. 12, the average cell temperature at the time of the CID activation was about 52.8° C. Generally, after the CID activation, the cell temperatures were kept increasing for a while by another 10-15° C. and then started to drop. FIG. 13 shows the results of the peak skin temperatures of the tested batteries. As shown in FIG. 13, the average peak skin temperature for the tested batteries was about 65.1° C.

Figure 14:
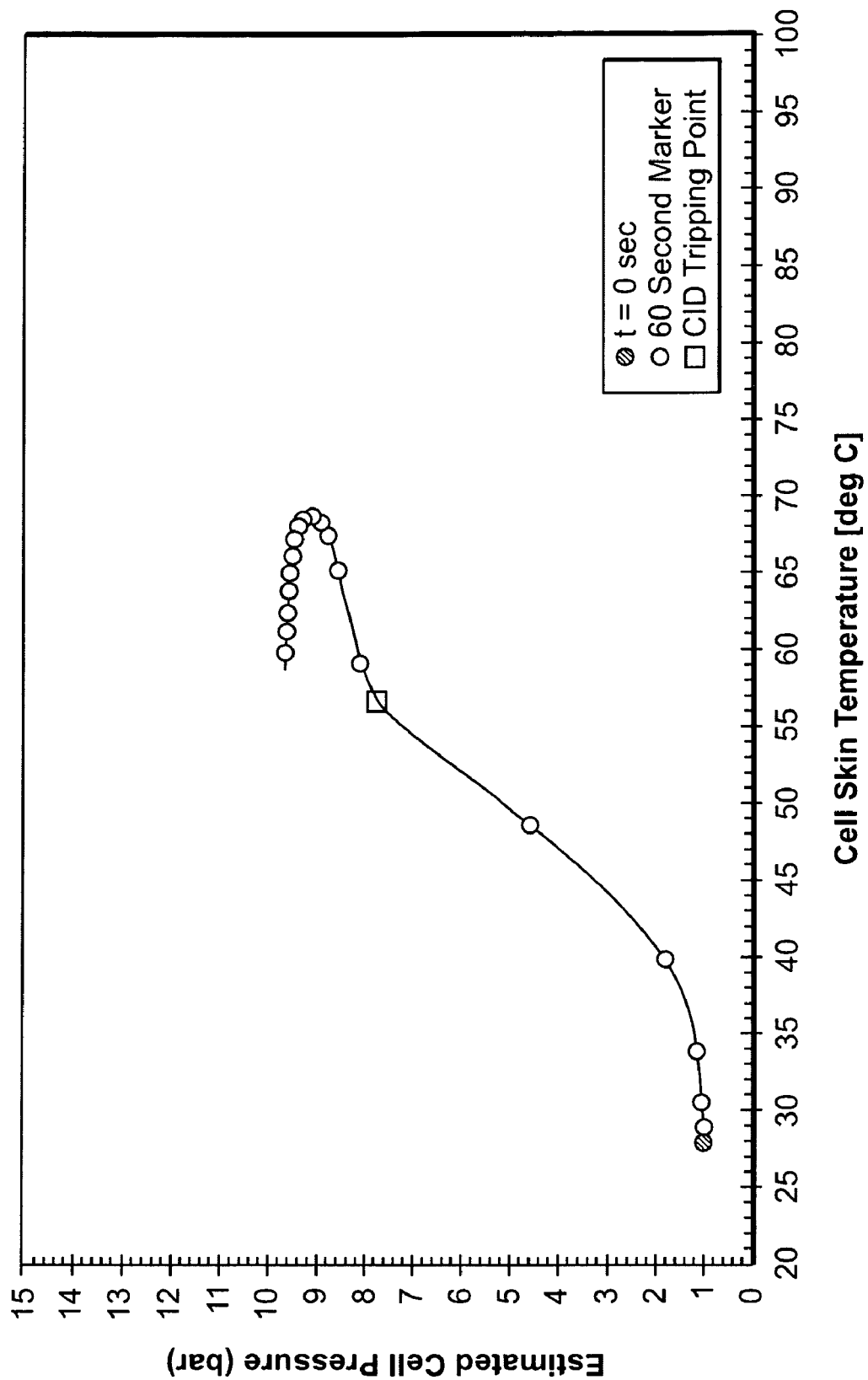
FIG. 14 is a graph showing calculated pressures versus the measured cell skin temperatures of a battery of the invention that was overcharged at a 2 C rate per minute.

The cell pressures (bar) were calculated based upon the measured cell thickness during the overcharge tests. For the tested cells, the average calculated gauge pressure of the CID trip was about 7.9 bar. FIG. 14 shows the calculated pressures versus the measured cell skin temperatures of one of the tested batteries. As shown in FIG. 14, the CID of the battery was activated after about 5-6 minutes after overcharging, and the cell skin temperature measured at that time was about 55° C. As discussed above, the cell temperature of the battery was kept increasing for a while by another 10-15° C., and then started to drop.

4B. Lithium-Ion batteries including 100% of $Li_{1+x}CoO_2$

Figure 15:
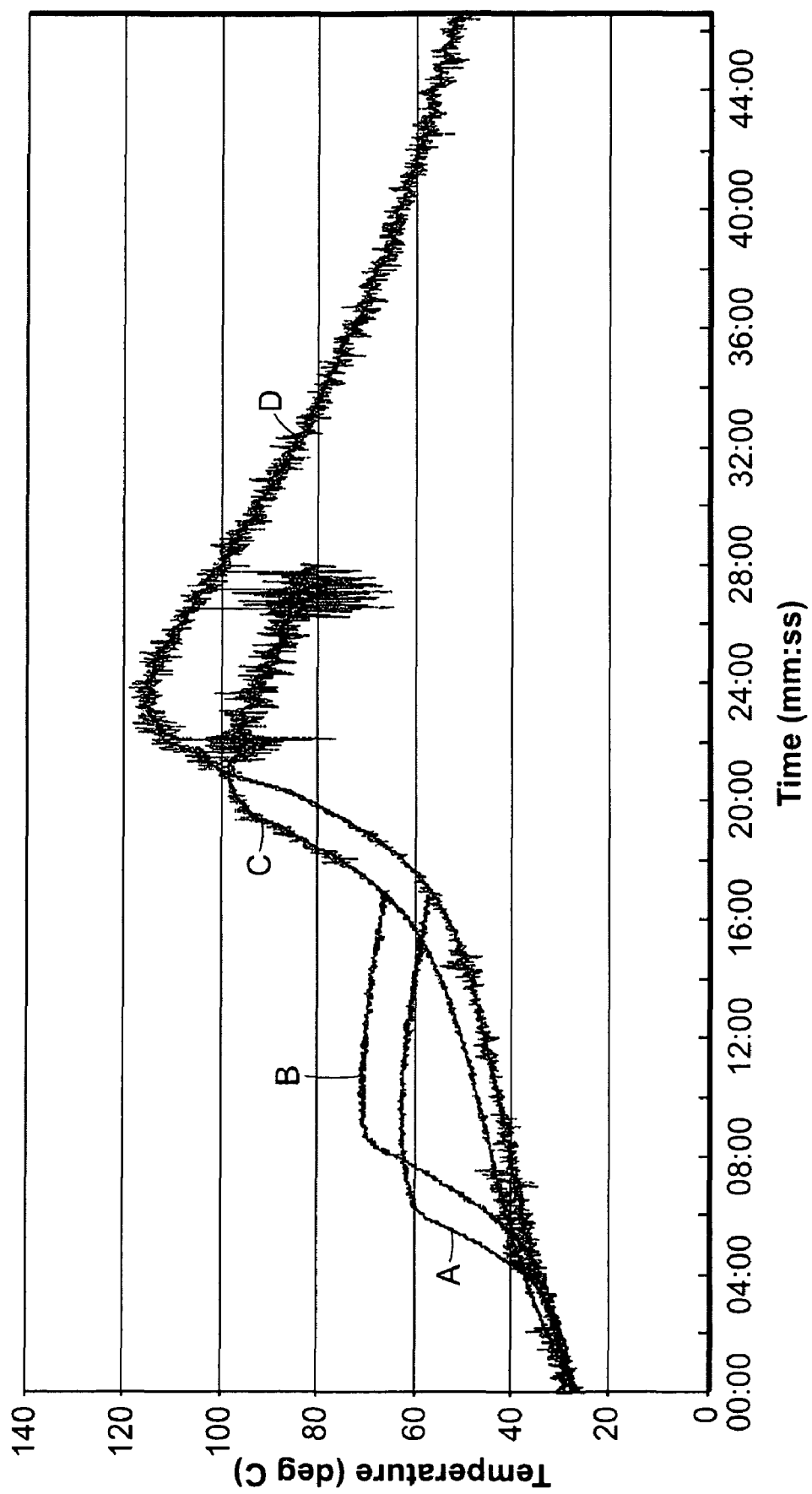
FIG. 15 is a graph showing cell skin temperatures of the batteries of the invention with CIDs of the invention (curves A and B) and control batteries with conventional CIDs (curves C and D).

For the tests of the example, the lithium-ion batteries that employed 100% of $Li_{1+x}CoO_2$ as their active cathode materials, as described in Example 2, were employed. The batteries were overcharged at 2 C charge rate, as described above in Example 4A. The average cell skin temperature of the batteries when their CIDs were activated was about 65° C., and the cell temperatures further increased up to about 72° C. FIG. 15 shows an average cell skin temperature of the tested batteries of Examples 4A and 4B when their CIDs were activated, where cure A represents batteries of Example 4A and curve B represents batteries of Example 4B.

4C. Control Tests for Lithium-Ion Batteries With Commercially Available CIDs

As a comparison, two 18650 commercially available cylindrical cells (Sony US18650GR: cells A and B of the same model), each of which employed standard 100% of $Li_{1+x}CoO_2$ cell chemistry and a CID, were tested. These cells were overcharged at 2 C charge rate, as described above in Example 4A. The CIDs of the Sony cells were activated at a temperature between about 94-96° C. and at about 110-120° C., as shown in FIG. 15 (curve C for 18650 cell A and curve D for 18650 cell B). The temperature of the cells after their CID activation continued to increase and reached about 110-126° C. which were very close to typical thermal runaway temperatures.

Additional two 18650 commercially available cylindrical cells (Sony US18650GR: cells C and D of the same model), each of which employed standard 100% of $Li_{1+x}CoO_2$ cell chemistry and a CID, were tested. The CIDs of these Sony cells were pressure tested, as described above in Example 3. The CIDs activated at about 13.8-14.3 bar (gauge pressure) (cell C at about 14.3 bar, cell D at about 13.8 bar).

Based upon the results of Examples 4A-4B and control Example 4C, the maximum cell temperatures reached in the batteries of the invention were significantly lower than the control 18650 cells with conventional CIDs. It is noted that the batteries of Examples 4A and 4B had greater than twice the volume of control 18650 cells, and yet exhibited much lower CID activation temperatures and pressures. Such lower CID activation temperatures and pressures, in turn, generally relate to reducing the likelihood of thermal runaway in the cells. Thus, the CIDs of the invention can enable batteries or cells, particularly relatively large batteries or cells (e.g., larger than 18650 cells) to exhibit highly improved safety-related characteristics.

INCORPORATION BY REFERENCE

U.S. patent application Ser. No. 11/821,585, filed on Jun. 22, 2007, which is entitled "Integrated Current-Interrupt Device For Lithium-Ion Cells"; International Application PCT/US07/14591, filed on Jun. 22, 2007, entitled "Lithium-Ion Secondary Battery"; U.S. Provisional Application No. 60/816,775, filed Jun. 27, 2006; U.S. Provisional Application No. 60/717,898, filed on Sep. 16, 2005; International Application No. PCT/US2005/047383, filed on Dec. 23, 2005; U.S. patent application Ser. No. 11/474,081, filed on Jun. 23, 2006; U.S. patent application Ser. No. 11/474,056, filed on Jun. 23, 2006; U.S. Provisional Application No. 60/816,977, filed on Jun. 28, 2006; U.S. patent application Ser. No. 11/485,068, filed on Jul. 12, 2006; U.S. patent application Ser. No. 11/486,970, filed on Jul. 14, 2006; U.S. Provisional Application No. 60/852,753, filed on Oct. 19, 2006; U.S. Provisional Application No. 61/125,327, filed on Apr. 24, 2008; U.S. Provisional Application No. 61/125,281, filed on Apr. 24, 2008; and U.S. Provisional Application No. 61/125,285, filed on Apr. 24, 2008 are all incorporated herein by reference in their entirety.

EQUIVALENTS

While this invention has been particularly shown and described with references to example embodiments thereof, it will be understood by those skilled in the art that various changes in form and details may be made therein without departing from the scope of the invention encompassed by the appended claims.

What is claimed is:

1. A current interrupt device, comprising:
    a) a first conductive plate, composed at least in part of aluminum, including:
        i) a frustum having a first end, a second end, the first end having a broader diameter than the second end,
        ii) a base extending radially from a perimeter of the first end of the frustum, and
        iii) an essentially planar cap sealing the second end of the frustum; and
    b) a second conductive plate, composed at least in part of aluminum, in electrical communication at a point of electrical contact with the essentially planar cap of the first conductive plate, wherein the second conductive plate defines at least one through-hole, whereby equalization of pressure between opposite sides of the second conductive plate is maintained without interference by the first conductive plate, and whereby higher pressure on a first surface of the first conductive plate facing the second conductive plate relative to a second surface of the first conductive plate will cause separation of the first conductive plate from the second conductive plate to thereby disrupt electrical communication at the electrical contact.

2. The current interrupt device of claim 1, wherein the second conductive plate is in electrical contact with the essentially planar cap of the first conductive plate through a weld.

3. The current interrupt device of claim 2, wherein the weld connecting the first and second plates ruptures when a gauge pressure between the plates is in a range of between about 4 $kg/cm^2$ and about 9 $kg/cm^2$.

4. The current interrupt device of claim 2, wherein the weld ruptures when a gauge pressure between the plates is in a range of between about 7 $kg/cm^2$ and about 9 $kg/cm^2$.

5. The current interrupt device of claim 2, wherein the second conductive plate defines a depression, and wherein the weld is at the depression.

6. The current interrupt device of claim 5, wherein the weld is at least one spot weld.

7. The current interrupt device of claim 6, wherein at least one of the spot welds includes aluminum.

8. The current interrupt device of claim 6, wherein the weld is two spot welds.

9. The current interrupt device of claim 2, wherein the thickness of the cap is in a range of between about 0.05 millimeter and about 0.5 millimeter.

10. The current interrupt device of claim 9, wherein the thickness of the cap is about 0.127 millimeter.

11. The current interrupt device of claim 9, wherein the diameter of the cap is in a range of between about 2 millimeter and about 8 millimeter.

12. The current interrupt device of claim 11, wherein a height of the cap from the base is in a range of between about 0.5 millimeter and about 1 millimeter.

13. The current interrupt device of claim 12, wherein the height of the cap from the base is about 0.762 millimeter.

14. The current interrupt device of claim 12, wherein the frustum has an angle to a plane parallel to the base of the first conductive plate in a range of between about 15 degrees and about 25 degrees.

15. The current interrupt device of claim 1, further including an electrically insulating ring that extends about the perimeter of the frustum and between the base of the first conductive plate and the second conductive plate.

16. The current interrupt device of claim 15, wherein the base of the first conductive plate includes at least one tab and wherein the electrically insulating ring defines at least one opening, the tab and the opening being capable of alignment when the insulating ring and the base are concentric, and wherein the tab can be malleably adjusted to secure the insulating ring to the first conductive plate.

17. The current interrupt device of claim 16, wherein the electrically insulating ring defines a groove about a perimeter of the insulating ring, and further including a metal ring having tabs, whereby the metal ring can rest inside the groove and whereby the tabs can be malleably adjusted and secured to a metal surface on which the first conductive plate is resting, thereby securing the insulating ring over the first conductive plate.

18. The current interrupt device of claim 2, wherein the thickness of the second conductive plate proximate to the weld with the first conductive plate is equal or greater than one-half of the thickness of the first conductive plate proximate to the weld, but less than the thickness of the first conductive plate proximate to the weld.

19. A battery, comprising:
    a) a first terminal in electrical communication with a first electrode of the battery, wherein the first terminal is a negative terminal;
    b) a second terminal in electrical communication with a second electrode of the battery, wherein the second terminal is a positive terminal;
    c) a battery can of aluminum having a cell casing and a lid which are in electrical communication with each other, the battery can being electrically insulated from the first terminal, wherein at least a portion of the battery can is at least a component of the second terminal, or is electrically connected to the second terminal; and
    d) at least one current interrupt device in electrical communication with the second electrode, the current interrupt device including:
        i) a first conductive plate, composed at least in part of aluminum, that includes a frustum, the frustum including a first end and a second end having a diameter less than that of the first end, and an essentially planar cap sealing the second end of the frustum, wherein the base is proximal to the battery can, and the essentially planar cap is distal to the battery can; and ii) a second conductive plate, composed at least in part of aluminum, in electrical communication at a point of electrical contact with the first conductive plate and with either of the first and second electrodes, wherein the second conductive plate defines at least one through-hole, whereby equalization of pressure between opposite sides of the second conductive plate is maintained without interference by the first conductive plate, and whereby higher pressure on a first surface of the first conductive plate facing the second conductive plate relative to a second surface of the first conductive plate will cause separation of the first conductive plate from the second conductive plate to thereby disrupt electrical communication at the electrical contact.

20. The battery of claim 19, wherein the first conductive plate and the second conductive plate are bonded together by at least one weld.

21. The battery of claim 20, wherein the cell casing is a prismatic cell casing.

22. The battery of claim 21, wherein the second conductive plate defines a depression, and wherein the weld is at the depression.

23. The battery of claim 22, wherein the weld is at least one spot weld.

24. The battery of claim 23, wherein at least one of the spot welds includes aluminum.

25. The battery of claim 23, wherein the weld is two spot welds.

26. The battery of claim 20, wherein the weld connecting the first and second plates ruptures when a gauge pressure between the plates is in a range of between about 4 kg/cm² and about 9 kg/cm².

27. The battery of claim 26, wherein the weld ruptures at a gauge pressure in a range of between about 5 kg/cm² and about 9 kg/cm².

28. The battery of claim 27, wherein the weld ruptures at a gauge pressure in a range of between about 7 kg/cm² and about 9 kg/cm².

29. The battery of claim 20, wherein the thickness of the second conductive plate proximate to the weld with the first conductive plate is equal or greater than one-half of the thickness of the first conductive plate proximate to the weld, but less than the thickness of the first conductive plate proximate to the weld.

30. The battery of claim 19, wherein the thickness of the cap is in a range of between about 0.05 millimeter and about 0.5 millimeter.

31. The battery of claim 30, wherein the diameter of the cap is in a range of between about 2 millimeter and about 8 millimeter.

32. The battery of claim 31, wherein the height of the cap from the base is in a range of between about 0.5 millimeter and about 1 millimeter.

33. The battery of claim 32, wherein the frustum has an angle to a plane parallel to the base of the first conductive plate in a range of between about 15 degrees and about 25 degrees.

34. The battery of claim 19, further including an electrically insulating ring that extends about the perimeter of the frustum and between the base of the first conductive plate and the second conductive plate.

35. The battery of claim 34, wherein the base of the first conductive plate includes at least one tab and when the electrically insulating ring defines at least one opening, the tab and the opening being capable of alignment when the insulating ring and the base are concentric, and wherein the tab can be malleably adjusted to secure the insulating ring to the first conductive plate.

36. The battery of claim 34, wherein the electrically insulating ring defines a groove about a perimeter of the insulating ring, and further including a metal ring having tabs, whereby the metal ring can rest inside the groove and whereby the tabs can be malleably adjusted and secured to a metal surface on which the first conductive plate is resting, thereby securing the insulating ring over the first conductive plate.

37. The battery of claim 19, wherein the current interrupt device is in electrical communication with the battery can.

38. The battery of claim 37, wherein the current interrupt device is in electrical communication with the lid of the battery can, and the lid includes a recess facing toward the first conductive plate.

39. The battery of claim 38, wherein the recess is coterminus with the perimeter of the first end of the frustum.

40. The battery of claim 19, wherein the first electrode includes an active cathode material, the active cathode material including a mixture that includes:
a) a lithium cobaltate; and
b) a manganate spinel represented by an empirical formula of

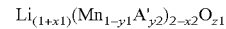

wherein:
x1 and x2 are each independently equal to or greater than 0.01 and equal to or less than 0.3;
y1 and y2 are each independently equal to or greater than 0.0 and equal to or less than 0.3;
z1 is equal to or greater than 3.9 and equal to or less than 4.2; and A' is at least one member of the group consisting of magnesium, aluminum, cobalt, nickel and chromium,
wherein the lithium cobaltate and the manganate spinel are in a weight ratio of lithium cobaltate: manganate spinel between about 0.95:0.05 and about 0.6:0.4.

41. The battery of claim 19, wherein the first electrode includes an active cathode material including a lithium cobaltate.

42. The battery of claim 41, wherein the lithium cobaltate is represented by an empirical formula of $Li_{1+x8}CoO_{z8}$, wherein x8 is equal to or greater than zero and equal to or less than 0.2, and z8 is equal to or greater than 1.9 and equal to or greater than 2.1.

43. The battery of claim 42, wherein the active cathode material includes a mixture that includes:
a) $Li_{1+x8}CoO_{z8}$; and
b) $Li_{(1+x1)}Mn_2O_{z1}$ wherein:
x1 is equal to or greater than 0.01 and equal to or less than 0.3; and
z1 is equal to or greater than 3.9 and equal to or less than 4.2,
wherein $Li_{1+x8}CoO_{z8}$ and $Li_{(1+x1)}Mn_2O_{z1}$ are in a weight ratio of lithium cobaltate: manganate spinel between about 0.95:0.05 and about 0.6:0,4.

44. The battery of claim 19, wherein the first electrode includes an active cathode material, the active cathode material including at least one lithium oxide selected from the group consisting of:
a) a lithium cobaltate;
b) a lithium nickelate;

c) a manganate spinel represented by an empirical formula of $$Li_{(1+x1)}(Mn_{1-y1}A'_{y2})_{2-x2}O_{z1}$$

wherein:
x1 and x2 are each independently equal to or greater than 0.01 and equal to or less than 0.3;
y1 and y2 are each independently equal to or greater than 0.0 and equal to or less than 0.3;
z1 is equal to or greater than 3.9 and equal to or less than 4.2; and A' is at least one member of the group consisting of magnesium, aluminum, cobalt, nickel and chromium;

d) a manganate spinel represented by an empirical formula of $$Li_{(1+x1)}Mn_2O_{z1}$$

wherein:
x1 is equal to or greater than 0.01 and equal to or less than 0.3; and
z1 is equal to or greater than 3.9 and equal to or less than 4.2; and e) and an olivine compound represented by an empirical formula of $$Li_{(1-x10)}A''_{x10}MPO_4$$

wherein:
x10 is equal to or greater than 0.05 and equal to or less than 0.2, or x10 is equal to or greater than 0.0 and equal to or less than 0.1; and
M is at least one member of the group consisting of iron, manganese, cobalt and magnesium; and
A'' is at least one member of the group consisting of sodium, magnesium, calcium, potassium, nickel and niobium.

45. A battery, comprising:
a) a first terminal in electrical communication with a first electrode of the battery, wherein the first terminal is a negative terminal;
b) a second terminal in electrical communication with a second electrode of the battery, wherein the second terminal is a positive terminal;
c) a battery can, composed at least in part of aluminum, having a cell casing and a lid welded on the cell casing, the battery can being electrically insulated from the first terminal, wherein at least a portion of the battery can is at least a component of the second terminal, or is electrically connected to the second terminal, wherein the welded lid is detached when an internal gauge pressure is equal to, or greater than, about 20 kg/cm$^2$;
d) at least one current interrupt device in electrical communication with the second electrode, the current interrupt device including:
  i) a first conductive plate, composed at least in part of aluminum, that includes a frustum, the frustum including a first end and a second end having a diameter less than that of the first end, and an essentially planar cap sealing the second end of the frustum, wherein the base is proximal to the battery can and the essentially planar cap is distal to the battery can; and
  ii) a second conductive plate, composed at least in part of aluminum, in electrical communication at a point of electrical contact with the first conductive plate and with either of the first and second electrodes wherein the second conductive plate defines at least one through-hole, whereby equalization of pressure between opposite sides of the second conductive plate is maintained without interference by the first conductive plate, and whereby higher pressure on a first surface of the first conductive plate facing the second conductive plate relative to a second surface of the first conductive plate will cause separation of the first conductive plate from the second conductive plate to thereby disrupt electrical communication at the electrical contact, and
wherein the weld connecting the first and second plates ruptures when a gauge pressure between the plates is in a range of between about 4 kg/cm$^2$ and 9 kg/cm$^2$; and e) at least one venting means on the cell casing, through which gaseous species inside of the battery exit when an internal gauge pressure is in a range of between about 10 kg/cm$^2$ and about 20 kg/cm$^2$.

46. The battery of claim 45, wherein the cell casing is a prismatic cell casing.

47. The battery of claim 46, wherein the cell casing has a 183665 configuration.

48. A lithium-ion battery, comprising:
a) a battery can, composed at least in part of aluminum, that includes a cell casing and a lid that are in electrical communication with each other; and
b) a current interrupt device that includes a first conductive plate of aluminum and a second conductive plate, composed at least in part of aluminum, in electrical communication at a point of electrical contact with each other, wherein the first conductive plate is in electrical communication with the battery can, wherein the second conductive plate defines at least one through-hole, whereby equalization of pressure between opposite sides of the second conductive plate is maintained without interference by the first conductive plate, and whereby higher pressure on a first surface of the first conductive plate facing the second conductive plate relative to a second surface of the first conductive plate will cause separation of the first conductive plate from the second conductive plate to thereby disrupt electrical communication at the electrical contact, and
wherein the electrical communication between the first and second conductive plates is interrupted when a gauge pressure between the plates is in a range of between about 4 kg/cm$^2$ and about 9 kg/cm$^2$.

49. The lithium-ion battery of claim 48, wherein an internal gauge pressure of the battery under a normal working condition is less than about 2 kg/cm$^2$.

50. The lithium-ion battery of claim 48, wherein the first conductive plate is in electrical contact with the lid of the battery can.

51. The lithium-ion battery of claim 48, comprising a cathode that includes an active cathode material, the active cathode material including a mixture that includes:
a) a lithium cobaltate; and
b) a manganate spinel represented by an empirical formula of $$Li_{(1+x1)}(Mn_{1-y1}A'_{y2})_{2-x2}O_{z1}$$

wherein:
x1 and x2 are each independently equal to or greater than 0.01 and equal to or less than 0.3;
y1 and y2 are each independently equal to or greater than 0.0 and equal to or less than 0.3;
z1 is equal to or greater than 3.9 and equal to or less than 4.2; and A' is at least one member of the group consisting of magnesium, aluminum, cobalt, nickel and chromium, wherein the lithium cobaltate and the manganate spinel are in a weight ratio of lithium cobaltate: manganate spinel between about 0.95:0.05 and about 0.6:0.4.

52. The lithium-ion battery of claim 48, comprising a cathode that includes an active cathode material including a lithium cobaltate.

53. The lithium-ion battery of claim 52, wherein the lithium cobaltate is represented by an empirical formula of $Li_{1+x8}CoO_{z8}$, wherein x8 is equal to or greater than zero and equal to or less than 0.2 and z8 is equal to or greater than 1.9 and equal to or greater than 2.1.

54. The lithium-ion battery of claim 53, wherein the active cathode material includes a mixture that includes:
   a) $Li_{1+x8}CoO_{z8}$; and
   b) $Li_{(1+x1)}Mn_2O_{z1}$ wherein:
      x1 is equal to or greater than 0.01 and equal to or less than 0.3; and
      z1 is equal to or greater than 3.9 and equal to or less than 4.2,
   wherein $Li_{1+x8}CoO_{z8}$ and $Li_{(1+x1)}Mn_2O_{z1}$ are in a weight ratio of lithium cobaltate: manganate spinel between about 0.95:0.05 and about 0.6:0.4.

55. The lithium-ion battery of claim 48, wherein the first electrode is a cathode that includes an active cathode material, the active cathode material including at least one lithium oxide selected from the group consisting of:
   a) a lithium cobaltate;
   b) a lithium nickelate;
   c) a manganate spinel represented by an empirical formula of $Li_{(1+x1)}(Mn_{1-y1}A'_{y2})_{2-x2}O_{z1}$ wherein:
      x1 and x2 are each independently equal to or greater than 0.01 and equal to or less than 0.3;
      y1 and y2 are each independently equal to or greater than 0.0 and equal to or less than 0.3;
      z1 is equal to or greater than 3.9 and equal to or less than 4.2; and
      A' is at least one member of the group consisting of magnesium, aluminum, cobalt, nickel and chromium;
   d) a manganate spinel represented by an empirical formula of $Li_{(1+x1)}Mn_2O_{z1}$ wherein:
      x1 is equal to or greater than 0.01 and equal to or less than 0.3; and
      z1 is equal to or greater than 3.9 and equal to or less than 4.2; and
   e) and an olivine compound represented by an empirical formula of $Li_{(1-x10)}A''_{x10}MPO_4$ wherein:
   x10 is equal to or greater than 0.05 and equal to or less than 0.2, or x10 is equal to or greater than 0.0 and equal to or less than 0.1; and
   M is at least one member of the group consisting of iron, manganese, cobalt and magnesium; and
   A" is at least one member of the group consisting of sodium, magnesium, calcium, potassium, nickel and niobium.

56. A lithium-ion battery, comprising:
   a) a first terminal in electrical communication with a first electrode of the battery, wherein the first terminal is a negative terminal;
   b) a second terminal in electrical communication with a second electrode of the battery, wherein the second terminal is a positive terminal;
   c) a battery can, composed at least in part of aluminum, having a cell casing and a lid welded on the cell casing, the battery can being electrically insulated from the first terminal, wherein at least a portion of the battery can is at least a component of the second terminal, or is electrically connected to the second terminal, wherein the welded lid is detached from the cell casing when an internal gauge pressure is equal to, or greater than, about 20 kg/cm$^2$;
   d) at least one current interrupt device in electrical communication with the second electrode, the current interrupt device including a first conductive plate, composed at least in part of aluminum, and a second conductive plate of aluminum in electrical communication at a point of electrical contact with each other, wherein the first conductive plate of the current interrupt device is in electrical communication with the cell can, wherein the second conductive plate defines at least one throughhole, whereby equalization of pressure between opposite sides of the second conductive plate is maintained without interference by the first conductive plate, and whereby higher pressure on a first surface of the first conductive plate facing the second conductive plate relative to a second surface of the first conductive plate will cause separation of the first conductive plate from the second conductive plate to thereby disrupt electrical communication at the electrical contact, and wherein the electrical communication between the first and second conductive plates is interrupted when an internal gauge pressure is in a range of between about 4 kg/cm$^2$ and about 9 kg/cm$^2$; and
   e) at least one venting means on the cell casing, through which gaseous species inside of the battery exit when an internal gauge pressure is in a range of between about 10 kg/cm$^2$ and about 20 kg/cm$^2$.

57. The battery of claim 56, wherein the cell casing is a prismatic cell casing.

58. The battery of claim 57, wherein the cell casing has a 183665 configuration.

* * * * *